US012088946B2

United States Patent
Yamada et al.

(10) Patent No.: US 12,088,946 B2
(45) Date of Patent: Sep. 10, 2024

(54) IMAGING DEVICE FOR REDUCING VARIATIONS OF AMOUNTS OF ELECTRIC CHARGES ACCUMULATED IN FLOATING DIFFUSION REGIONS

(71) Applicant: Panasonic Intellectual Property Management Co., Ltd., Osaka (JP)

(72) Inventors: Shota Yamada, Shiga (JP); Shigetaka Kasuga, Osaka (JP); Motonori Ishii, Osaka (JP); Akito Inoue, Osaka (JP); Yutaka Hirose, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 182 days.

(21) Appl. No.: 17/679,942

(22) Filed: Feb. 24, 2022

(65) Prior Publication Data

US 2022/0182572 A1    Jun. 9, 2022

Related U.S. Application Data

(63) Continuation of application No. PCT/JP2020/029234, filed on Jul. 30, 2020.

(30) Foreign Application Priority Data

Sep. 6, 2019    (JP) ................. 2019-163235

(51) Int. Cl.
*H04N 25/778*    (2023.01)
*G01S 7/481*    (2006.01)
(Continued)

(52) U.S. Cl.
CPC ......... *H04N 25/778* (2023.01); *G01S 7/4816* (2013.01); *G01S 7/4865* (2013.01); *G01S 17/894* (2020.01); *H04N 25/771* (2023.01)

(58) Field of Classification Search
CPC .. H04N 25/778; H04N 25/771; H04N 25/623; H04N 25/70; H04N 25/77;
(Continued)

(56) References Cited

U.S. PATENT DOCUMENTS

2011/0164158 A1*  7/2011  Iida ................... H01L 27/14645
                                                    348/294
2017/0251151 A1*  8/2017  Hicks ................ H01L 27/14625
(Continued)

FOREIGN PATENT DOCUMENTS

JP    2009-017218 A    1/2009
JP    2018-160667 A    10/2018
(Continued)

OTHER PUBLICATIONS

International Search Report issued in corresponding International Application No. PCT/JP2020/029234, dated Oct. 13, 2020 w/Machine English Translation.

*Primary Examiner* — Albert H Cutler
(74) *Attorney, Agent, or Firm* — Rimon P.C.

(57) ABSTRACT

An imaging device includes: a solid-state imaging element having a plurality of pixel cells arranged in a matrix; and a control part configured to control the solid-state imaging element. The pixel cells each include an avalanche photodiode, a floating diffusion part configured to accumulate electric charges, a transfer transistor connecting a cathode of the avalanche photodiode and the floating diffusion part, and a reset transistor for resetting electric charges accumulated in the floating diffusion part. The control part controls the reset transistor to discharge electric charges exceeding a predetermined electric charge amount, of electric charges accumulated in the floating diffusion part from the cathode of the avalanche photodiode via the transfer transistor.

10 Claims, 11 Drawing Sheets

(51) Int. Cl.
*G01S 7/4865* (2020.01)
*G01S 17/894* (2020.01)
*H04N 25/771* (2023.01)

(58) Field of Classification Search
CPC ...... H04N 25/76; H04N 25/772; H04N 25/60; H04N 25/62; H04N 25/63; H04N 25/65; H04N 25/67; H04N 13/271; H04N 13/254; G01S 7/4816; G01S 7/4865; G01S 17/894; G01S 7/4863; G01J 2001/4466; G01J 2001/442; H01L 31/107; H01L 31/02027
See application file for complete search history.

(56) References Cited

U.S. PATENT DOCUMENTS

| | | |
|---|---|---|
| 2020/0043971 A1 | 2/2020 | Sugawa et al. |
| 2020/0106982 A1 | 4/2020 | Kasuga et al. |

FOREIGN PATENT DOCUMENTS

| | | |
|---|---|---|
| WO | 2018/066143 A1 | 4/2018 |
| WO | 2018/216400 A1 | 11/2018 |

\* cited by examiner

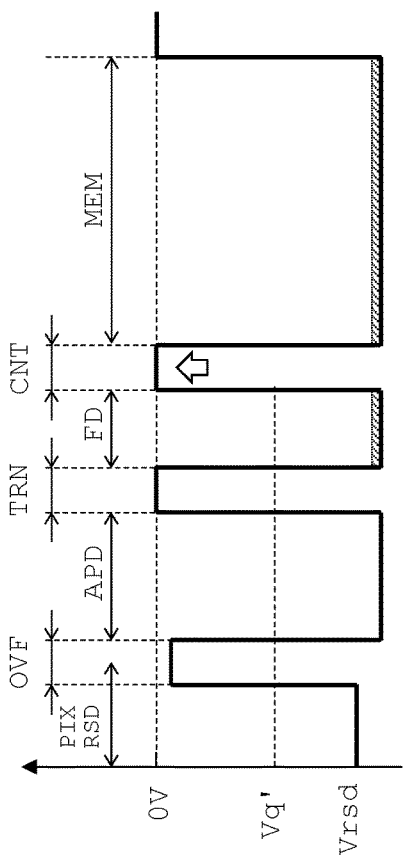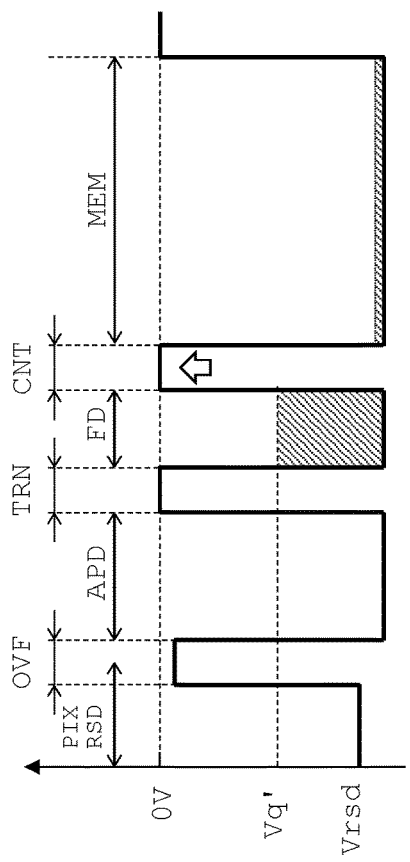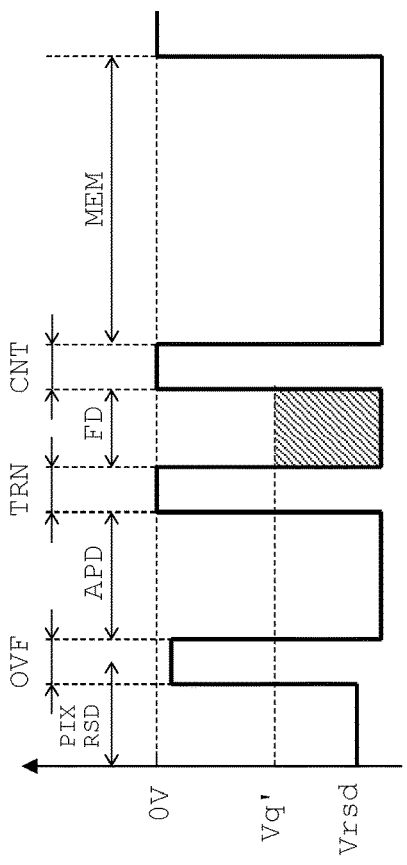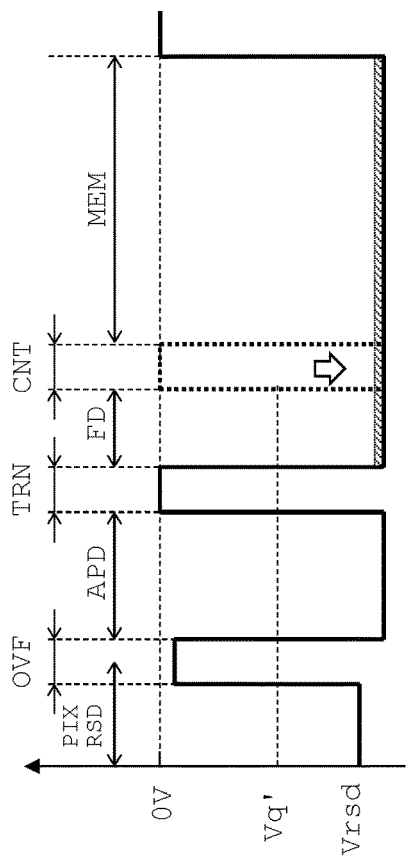

<TRANSFER>

<FINAL ACCUMULATION>

<ACCUMULATION>

<COUNT>

IMAGING DEVICE FOR REDUCING VARIATIONS OF AMOUNTS OF ELECTRIC CHARGES ACCUMULATED IN FLOATING DIFFUSION REGIONS

CROSS REFERENCE TO RELATED APPLICATION

This application is a continuation of International Application No. PCT/JP2020/029234 filed on Jul. 30, 2020, entitled "IMAGE CAPTURING DEVICE", which claims priority under 35 U.S.C. Section 119 of Japanese Patent Application No. 2019-163235 filed on Sep. 6, 2019, entitled "IMAGING DEVICE". The disclosures of the above applications are incorporated herein by reference.

BACKGROUND OF THE INVENTION

1. Field of the Invention

The present invention relates to an imaging device in which a solid-state imaging element is used.

2. Disclosure of Related Art

To date, an imaging device in which a solid-state imaging element is used has been used in various fields such as medical treatment and radiation measurement. Recently, such an imaging device has also been used in an object detection device that projects light to a target region and detects the presence or absence of an object in the target region on the basis of the presence or absence of reflected light of the projected light. In this case, the distance to the object is measured on the basis of the time difference between the timing of projecting light with respect to the target region and the timing of receiving reflected light. The presence or absence of reflected light is detected at each pixel of the solid-state imaging element, and the distance to the object is measured. By mapping the measured distance to each pixel position, a distance image with respect to the target region can be generated.

In a device that requires detection of weak light, a solid-state imaging element having avalanche photodiodes (hereinafter referred to as "APDs") arranged in an array can be used. For example, in the above object detection device, the intensity of the reflected light is inversely proportional to the square of the distance to the object, so that the intensity of the reflected light received by the solid-state imaging element is considerably decreased as the distance measurement range becomes longer. In such a case, it is advantageous to use a solid-state imaging element having APDs arranged in an array. Each APD amplifies electrons (electric charges) generated by collision of photons, by avalanche multiplication. Accordingly, it is possible to detect weak light. In this type of solid-state imaging element, an APD and a processing circuit therefor are arranged in each pixel cell.

International Publication No. 2018/216400 describes a solid-state imaging element in which an APD and a processing circuit therefor are arranged in each pixel cell. In this processing circuit, when photons are incident on the APD as a result of exposure, electric charges amplified by avalanche multiplication are collected in the cathode of the APD. The electric charges collected in the cathode of the APD are distributed to a floating diffusion part via a transfer transistor. Thereafter, the electric charges are redistributed to a memory part (capacitor) via a count transistor. As described above, each time photons are incident on the APD in each sequence, electric charges are accumulated in the memory part. Then, after the sequence is performed a predetermined number of times, the electric charges accumulated in the memory part are converted into a voltage, and the voltage is outputted to a vertical signal line.

In the configuration of International Publication No. 2018/216400, electric charges may be accumulated in the cathode of the APD in excess of the saturated electric charge amount by avalanche multiplication. In order to prevent such excessive electric charge accumulation, in the configuration of International Publication No. 2018/216400, the potential barrier of a reset transistor interposed between the cathode of the APD and a reset drain power source is set so as to be lower than the potential barrier of the transfer transistor. Accordingly, when excessive electric charges are generated in the cathode of the APD during exposure, the excess electric charges are guided to the reset drain power source. Owing to this operation, the amount of the electric charges accumulated in the cathode of the APD is maintained substantially constant.

However, as described above, even in the configuration in which the electric charges generated excessively in the APD are guided to the reset drain, the amount of the electric charges distributed from the cathode of the APD to the floating diffusion part are not always constant. For example, if electric charges are further increased by avalanche multiplication while the electric charges are distributed from the cathode of the APD to the floating diffusion part, the amount of the electric charges accumulated in the floating diffusion part after the distribution may vary. This variation can be, for example, a variation (distance measurement error) when a distance image is generated on the basis of a signal from each pixel cell.

SUMMARY OF THE INVENTION

An imaging device according to a main aspect of the present invention includes: a solid-state imaging element having a plurality of pixel cells arranged in a matrix; and a control part configured to control the solid-state imaging element. Here, the pixel cells each include an avalanche photodiode, a floating diffusion part configured to accumulate electric charges, a transfer transistor connecting a cathode of the avalanche photodiode and the floating diffusion part, and a reset transistor for resetting electric charges accumulated in the floating diffusion part. In addition, the control part controls the reset transistor to discharge electric charges exceeding a predetermined electric charge amount, of electric charges accumulated in the floating diffusion part from the cathode of the avalanche photodiode via the transfer transistor. Hereinafter, this is described as "leveling off".

In the imaging device according to this aspect, by controlling the reset transistor, the electric charges exceeding the predetermined electric charge amount, of the electric charges accumulated in the floating diffusion part from the cathode of the avalanche photodiode via the transfer transistor, are discharged. Therefore, the variation of the amount of the electric charges accumulated in the floating diffusion part can be reduced.

BRIEF DESCRIPTION OF THE DRAWINGS

FIG. 8A to FIG. 8D are each a diagram illustrating an operation sequence of the pixel cell according to Embodiment 2;

It should be noted that the drawings are solely for description and do not limit the scope of the present invention by any degree.

DESCRIPTION OF PREFERRED EMBODIMENTS

Hereinafter, embodiments of the present invention will be described with reference to the drawings. In each embodiment, a configuration example in the case where an imaging device is mounted on a distance measurement device for measuring the distance to an object is shown.

Embodiment 1

Figure 1:
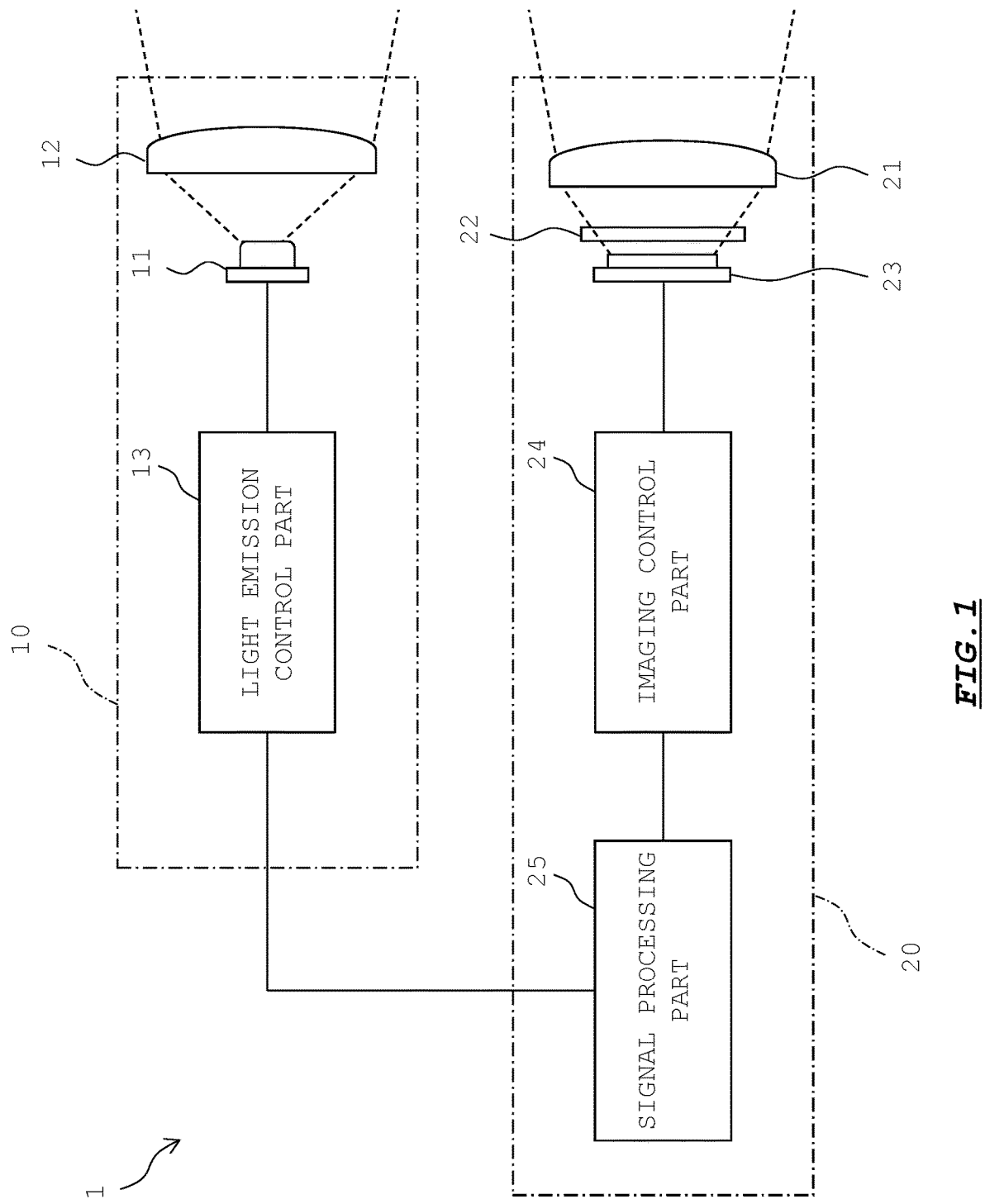
FIG. 1 is a diagram showing a configuration of a distance measurement device according to Embodiment 1.

FIG. 1 is a diagram showing a configuration of a distance measurement device 1 according to Embodiment 1.

The distance measurement device 1 includes a light projecting device 10 and an imaging device 20. The light projecting device 10 projects light to a target region. The imaging device 20 receives reflected light obtained by reflecting the light emitted from the light projecting device 10 on an object in the target region.

The light projecting device 10 includes a light source 11, a projection optical system 12, and a light emission control part 13. The light source 11 is composed of a laser light source, a light emitting diode (LED), or the like, and emits light having a predetermined wavelength. The projection optical system 12 projects the light emitted from the light source 11 to the target region at a predetermined spread angle. The projection optical system 12 includes a single lens or a plurality of lenses. The projection optical system 12 may include a concave mirror or the like. The light emission control part 13 causes the light source 11 to emit light in a pulsed manner on the basis of control by a signal processing part 25.

The imaging device 20 includes a light-receiving optical system 21, a filter 22, a solid-state imaging element 23, an imaging control part 24, and the signal processing part 25. The light-receiving optical system 21 forms an image of the reflected light obtained by reflecting the light emitted from the light projecting device 10 on an object in the target region, on a light-receiving surface of the solid-state imaging element 23. The light-receiving optical system 21 includes a single lens or a plurality of lenses. The light-receiving optical system 21 may include a concave mirror or the like. The filter 22 allows the light emitted from the light source 11 to pass therethrough and removes light having other wavelengths.

The solid-state imaging element 23 has a configuration in which a plurality of pixel cells are arranged in a matrix. That is, a plurality of pixel cells are arranged in the solid-state imaging element 23 so as to be adjacently aligned in a straight line in each of a row direction and a column direction. In the solid-state imaging element 23, an APD and a processing circuit therefor are mounted in each pixel cell.

The imaging control part 24 drives each pixel cell on the basis of control by the signal processing part 25. The signal processing part 25 controls the light emission control part 13 and the imaging control part 24 to measure the distance to an object existing in the target region. That is, the signal processing part 25 causes the light source 11 to emit light in a pulsed manner, via the light emission control part 13, and causes the solid-state imaging element 23 to receive reflected light based on this pulsed light emission, via the imaging control part 24. Then, the signal processing part 25 measures the distance to an object existing at a position, on the target region, corresponding to each pixel cell on the basis of the time difference between the timing of pulsed light emission and the timing of receiving the reflected light at each pixel cell.

In the configuration of FIG. 1, the signal processing part 25 is included on the imaging device 20 side. However, the signal processing part 25 may be included on the light projecting device 10 side, or may be included in a device separate from the light projecting device 10 and the imaging device 20.

In the configuration of FIG. 1, the solid-state imaging element 23 outputs a reflected light detection signal of each pixel cell to the imaging control part 24. When each pixel cell receives the reflected light, the pixel cell outputs a detection signal having a voltage level based on avalanche multiplication to the imaging control part 24. The amount of the reflected light incident on each pixel cell is decreased in inverse proportion to the square of the distance to the object. In addition, the amount of the reflected light incident on each pixel cell also changes depending on the reflectance of the object. Even if the amount of the reflected light changes as described above, each pixel cell outputs a detection signal having a predetermined voltage level based on avalanche multiplication to the imaging control part 24.

Specifically, when photons are incident on the APD arranged in each pixel cell, the APD amplifies electrons (electric charges) generated by collision of the photons to a saturated electric charge amount by avalanche multiplication. Each cell converts the saturated electric charge amount to a voltage, and outputs the voltage obtained as a result of the conversion, as a detection signal. Accordingly, the detection signal outputted from each cell is made uniform as the voltage corresponding to the saturated electric charge amount. As described above, each pixel cell outputs a detection signal having a constant voltage level to the imaging control part 24 regardless of the amount of the received reflected light.

However, in each pixel cell, due to various factors, electric charges whose amount is different from the normal saturated electric charge amount by avalanche multiplication may be generated. Therefore, the detection signal outputted from each pixel cell may vary with respect to the voltage corresponding to the saturated electric charge amount. If the detection signal varies for each pixel cell as described above, the processing of a circuitry subsequent to the imaging control part 24 may become unstable. It is preferable that the variation of the detection signal of each pixel cell is suppressed as much as possible.

Therefore, in Embodiment 1, a configuration for suppressing the variation of the detection signal of each pixel cell is used. Hereinafter, this configuration will be described.

First, a configuration of a pixel cell 100 will be described with reference to FIG. 2.

The pixel cell 100 includes an APD 101, an APD reset transistor 102, a transfer transistor 103, an FD reset transistor 104, an amplification transistor 105, and a selection transistor 106.

The APD 101 is an avalanche photodiode that amplifies electrons (electric charges) generated by collision of photons to a saturated electric charge amount by avalanche multiplication. The APD 101 is used in a Geiger amplification mode. A reverse bias voltage VSUB (for example, 25 V) corresponding to the Geiger amplification mode is applied to the anode of the APD 101. When photons are incident on the APD 101, electrons (electric charges) are accumulated in the cathode of the APD 101.

The APD reset transistor 102 is a transistor for resetting the electric charges accumulated in the cathode of the APD 101. By applying a reset signal OVF to the gate of the APD reset transistor 102, the electric charges accumulated in the cathode of the APD 101 are discharged to a reset drain power source PIXRSD via the APD reset transistor 102. Accordingly, the electric charges accumulated in the cathode of the APD 101 are reset.

The transfer transistor 103 is a transistor for transferring the electric charges accumulated in the cathode of the APD 101 to a floating diffusion part 110. By applying a transfer signal TRN to the gate of the transfer transistor 103, the electric charges accumulated in the cathode of the APD 101 are transferred to the floating diffusion part 110 via the transfer transistor 103.

The FD reset transistor 104 is a transistor for resetting the electric charges accumulated in the floating diffusion part 110. By applying a reset signal RST to the gate of the FD reset transistor 104, the electric charges accumulated in the floating diffusion part 110 are discharged to a reset drain power source RSD via the FD reset transistor 104. Accordingly, the electric charges accumulated in the floating diffusion part 110 are reset.

The amplification transistor 105 is a transistor for converting the amount of the electric charges accumulated in the floating diffusion part 110 into a voltage on the basis of a constant voltage VDD applied to the drain thereof. The selection transistor 106 is a transistor for outputting the voltage obtained as a result of the conversion by the amplification transistor 105 to a vertical signal line Vsig. By applying a selection signal SEL to the gate of the selection transistor 106, the voltage obtained as a result of the conversion by the amplification transistor 105 is outputted to the vertical signal line Vsig. The voltage outputted to the vertical signal line Vsig is outputted as a detection signal of the pixel cell 100 to the imaging control part 24 in FIG. 1.

In Embodiment 1, the capacity of the floating diffusion part 110 is set to be about half the capacity of an electric charge accumulation region of the cathode of the APD 101. However, the method for setting the capacity of the floating diffusion part 110 is not limited thereto, and various setting methods may be applied.

FIG. 3A to FIG. 3D are each a diagram illustrating an operation sequence of the pixel cell 100.

Figure 2:
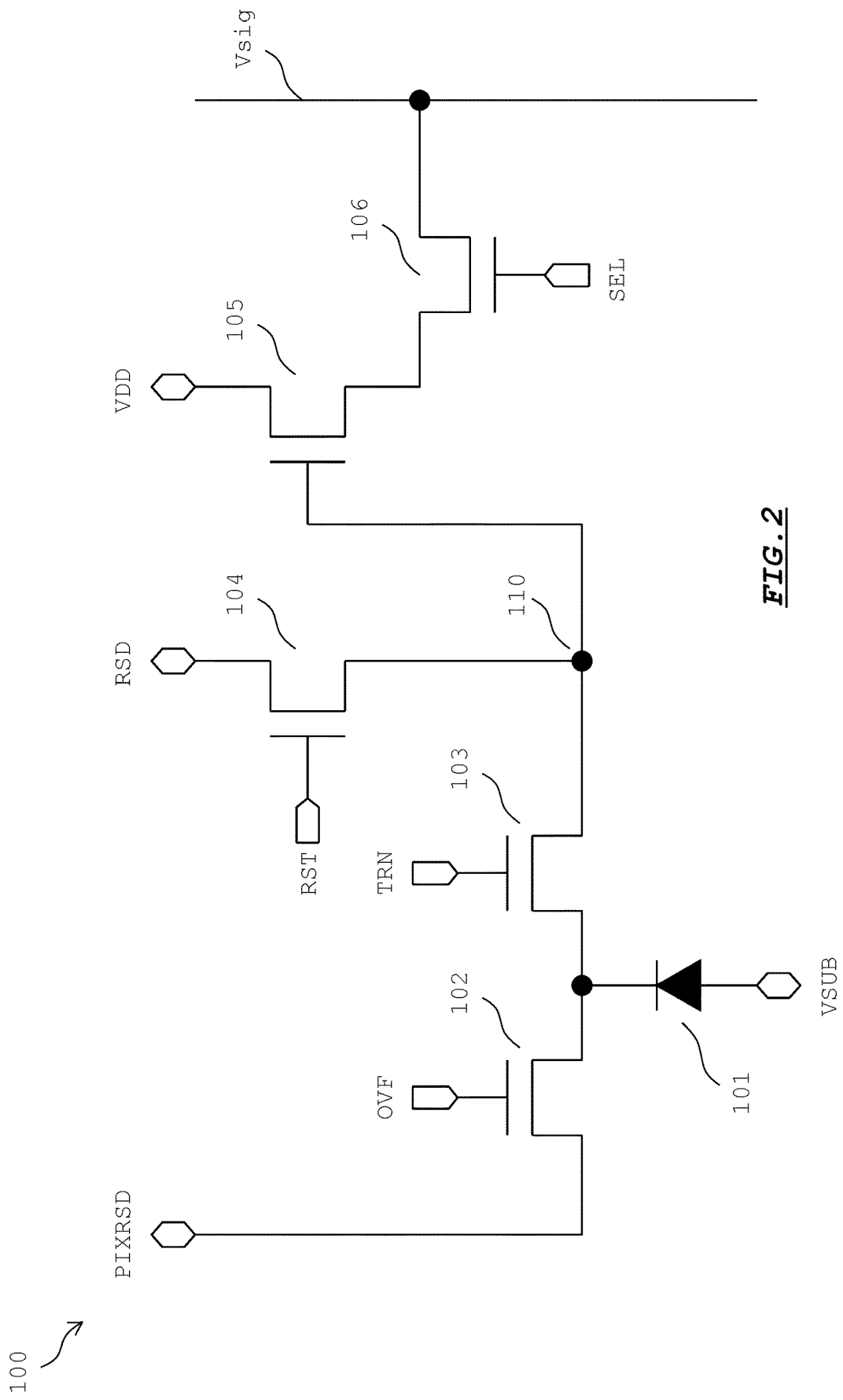
FIG. 2 is a diagram showing a configuration of a pixel cell according to Embodiment 1.

FIG. 3A to FIG. 3D each show a potential diagram of a circuitry from the reset drain power source PIXRSD in FIG. 2 through the APD reset transistor 102, the transfer transistor 103, the floating diffusion part 110, and the FD reset transistor 104 to the reset drain power source RSD. On the vertical axis, the direction of an arrow is the direction of low potential.

In FIG. 3A to FIG. 3D, "PIXRSD" indicates the potential of the reset drain power source PIXRSD, "APD" indicates the potential of the cathode of the APD 101, "FD" indicates the potential of the floating diffusion part 110, and "RSD" indicates the potential of the reset drain power source RSD. In addition, "OVF" indicates the potential of the APD reset transistor 102, "TRN" indicates the potential of the transfer transistor 103, and "RST" indicates the potential of the FD reset transistor 104.

Figure 3A:
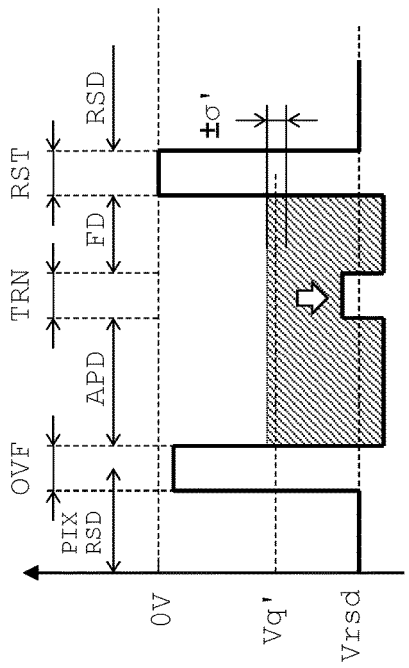
FIG. 3A to FIG. 3D are each a diagram illustrating an operation sequence of the pixel cell according to Embodiment 1.

The initial state of FIG. 3A shows a state after the cathode of the APD 101 and the floating diffusion part 110 are reset. In the initial state, the PIXRSD and the RSD are set to a potential Vrsd.

Also, in this initial state, the imaging control part 24 drives the APD reset transistor 102 with a low voltage, thereby generating a potential barrier at the OVF. Furthermore, the imaging control part 24 sets the transfer transistor 103 and the FD reset transistor 104 to be OFF, thereby generating a potential barrier having a height of potential of 0V at the TRN and the RST.

From this state, the imaging control part 24 performs exposure to each pixel cell 100 for a predetermined time in accordance with the pulsed light emission of the light source 11. Accordingly, when the reflected light is incident on the APD 101, electric charges (electrons) are accumulated in the cathode of APD 101, and the potential of the APD changes as shown in FIG. 3B. In FIG. 3B, the accumulation of the electric charges is shown by hatching. When electric charges whose amount is equal to the normal saturated electric charge amount are generated by avalanche multiplication, the potential of the APD becomes a potential Vq (hereinafter, referred to as "quenching potential Vq").

The saturated electric charge amount can vary for each APD 101. Therefore, the quenching potential Vq can also vary in the range of dispersion ±σ for each APD 101. FIG. 3B illustrates the case where, due to this variation, electric charges are generated in an electric charge amount slightly larger than a typical saturated electric charge amount. In addition, in FIG. 3B, a typical quenching potential is indicated as Vq. Hereinafter, the "quenching potential Vq" means a typical quenching potential unless otherwise specified.

When electric charges are generated in an electric charge amount exceeding the potential of the OVF, the excess electric charges move to the PIXRSD beyond the potential barrier of the OVF and are discharged to the reset drain power source PIXRSD.

When the electric charge accumulation in the cathode of the APD 101 ends as such, the imaging control part 24 sets the transfer transistor 103 to be ON. Accordingly, as shown in FIG. 3C, the potential barrier of the TRN falls, and the electric charges accumulated in the cathode of the APD 101 are distributed to the floating diffusion part 110 via the transfer transistor 103.

Figure 3C:
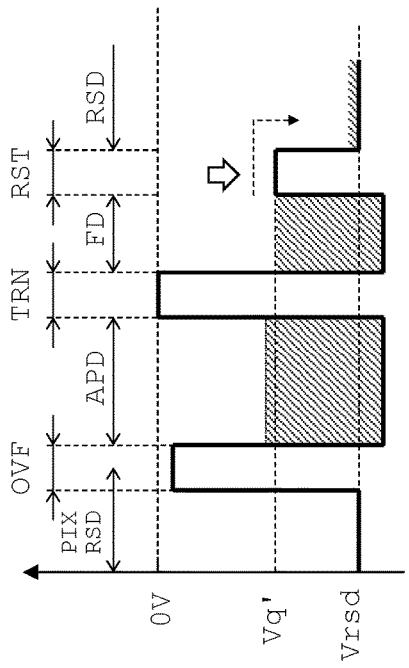
Figure 3B:
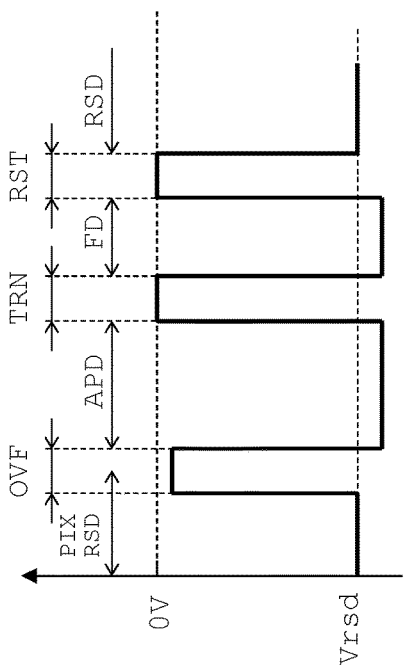

In FIG. 3C, a potential Vq' is a potential of electric charges distributed to the floating diffusion part 110 when electric charges (electric charges corresponding to the quenching potential Vq) whose amount is equal to the normal saturated electric charge amount are accumulated in the cathode of the APD 101 in an accumulation step of FIG. 3B. Hereinafter, this potential Vq' is referred to as a reference accumulation potential. Here, in the step of FIG. 3B, since the electric charges are accumulated in the cathode of the APD 101 in an electric charge amount exceeding the typical saturated electric charge amount, the amount of electric charges distributed to the floating diffusion part 110 is also an electric charge amount slightly exceeding the reference accumulation potential Vq' as shown in FIG. 3C. Depending on the variation of the saturated electric charge amount, the voltage corresponding to the amount of the electric charges accumulated in the step of FIG. 3C also varies in the range of dispersion $\pm\sigma'$ with respect to the typical reference accumulation potential Vq'. Hereinafter, the "reference accumulation potential Vq'" means a reference accumulation potential corresponding to the typical quenching potential Vq, unless otherwise specified.

Figure 3D:
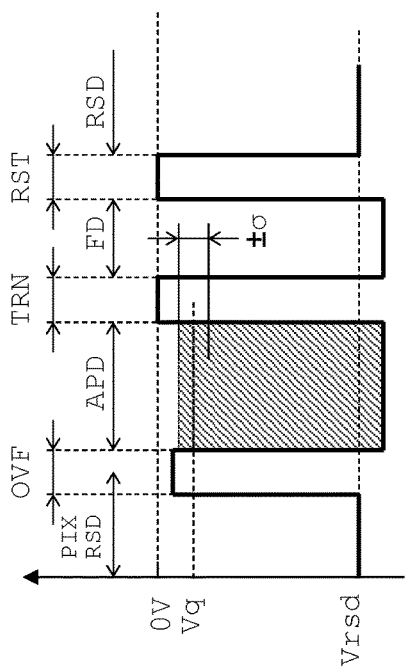

Thereafter, the imaging control part 24 switches the transfer transistor 103 to be OFF, and further sets the FD reset transistor 104 to be half-ON. Accordingly, as shown in FIG. 3D, the potential barrier of the TRN rises, and the potential barrier of the RST falls.

Here, the imaging control part 24 sets a voltage to be applied to the gate of the FD reset transistor 104, such that the potential barrier of the RST becomes the reference accumulation potential Vq'. Accordingly, as shown in FIG. 3D, of the electric charges distributed to the floating diffusion part 110, the excess electric charges exceeding the reference accumulation potential Vq' move to the RSD beyond the potential barrier of the RST. That is, the excess electric charges exceeding the reference accumulation potential Vq' are discharged to the reset drain power source RSD via the FD reset transistor 104. Accordingly, the electric charges accumulated in the floating diffusion part 110 are fixed to a constant amount (amount corresponding to the reference accumulation potential Vq').

Thereafter, the imaging control part 24 sets the FD reset transistor 104 to be OFF. Accordingly, the potential barrier of the RST rises, and the amount of the electric charges accumulated in the floating diffusion part 110 is determined to be a predetermined electric charge amount (here, the electric charge amount corresponding to the reference accumulation potential Vq'). Then, the imaging control part 24 sets the selection transistor 106 to be ON, and outputs a voltage signal corresponding to the amount of the electric charges accumulated in the floating diffusion part 110, to the vertical signal line Vsig. Accordingly, the output of the detection signal of the pixel cell 100 is completed.

After the detection signal is outputted as described above, the imaging control part 24 performs an initialization process of resetting the electric charges accumulated in the cathode of the APD 101 and the electric charges accumulated in the floating diffusion part 110. That is, the imaging control part 24 sets the APD reset transistor 102 and the FD reset transistor 104 to be ON.

Figure 4A:
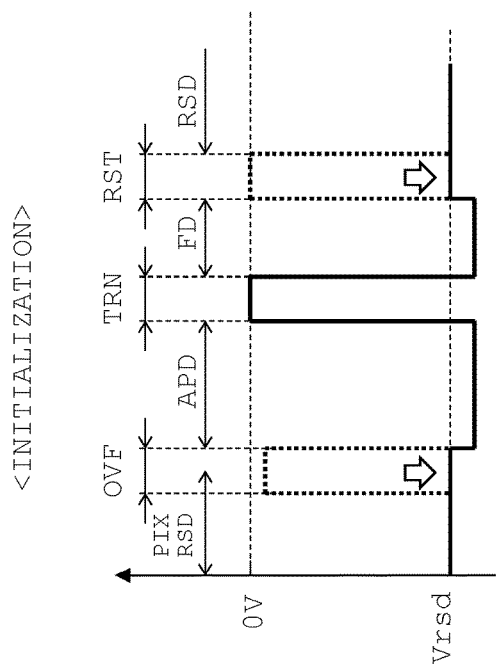
FIG. 4A is a diagram illustrating the operation sequence of the pixel cell according to Embodiment 1.

Accordingly, as shown in FIG. 4A, the potential barriers of the OVF and the RST fall, and the electric charges accumulated in the cathode of the APD 101 and the electric charges accumulated in the floating diffusion part 110 are discharged to the reset drain power source PIXRSD and the reset drain power source RSD via the APD reset transistor 102 and the FD reset transistor 104, respectively. Thereafter, the imaging control part 24 repeatedly executes the process of FIG. 3A to FIG. 3D and FIG. 4A to continue the output of the detection signal of the pixel cell 100.

Figure 4B:
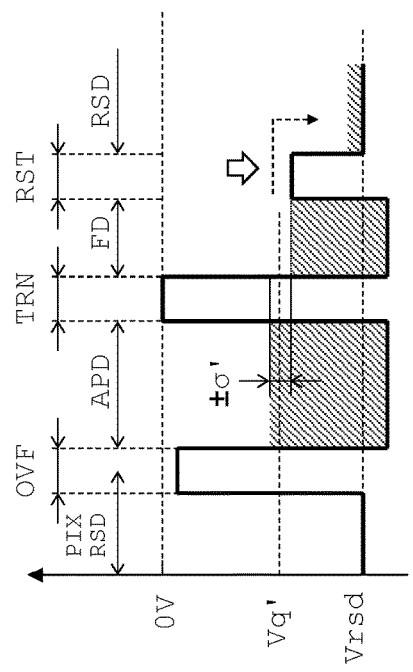
FIG. 4B is a diagram illustrating another method for setting a leveling-off level for adjusting the amount of electric charges accumulated in a floating diffusion part to a predetermined level, according to Embodiment 1.

In a leveling-off step of FIG. 3D, the height of the potential barrier when the FD reset transistor 104 is set to be half-ON is set to the same potential as the reference accumulation potential Vq', but the height of the potential barrier at the time of half-ON is not limited thereto. For example, as shown in FIG. 4B, when a dispersion is denoted by $\sigma$, the range in which the potential of the electric charges distributed to the floating diffusion part 110 can vary with respect to the reference accumulation potential Vq' can be represented by Vq'$\pm\sigma$. The height of the potential barrier at the time of half-ON may be set to the maximum value including this dispersion, that is, the potential higher by $+\sigma$ than the reference accumulation potential Vq'.

In this case, the amount of the electric charges remaining in the floating diffusion part 110 after the leveling-off step is smaller than that in the case of FIG. 3D. However, the amount of the electric charges remaining in the floating diffusion part 110 after the leveling-off step can be more reliably fixed to a constant amount. In addition, the height of the potential barrier when the FD reset transistor 104 is half-ON may be set so as to be slightly higher than the potential obtained by adding the variation to the reference accumulation potential Vq', or may be set to another potential within the range of the variation.

However, in order to more reliably fix the amount of the electric charges remaining in the floating diffusion part 110 after the leveling-off step to a constant amount, the height of the potential barrier when the FD reset transistor 104 is half-ON is preferably set so as to be equal to or higher than the reference accumulation potential Vq', and is further preferably set so as to be equal to or higher than the potential obtained by adding the variation to the reference accumulation potential Vq'.

Figure 4C:
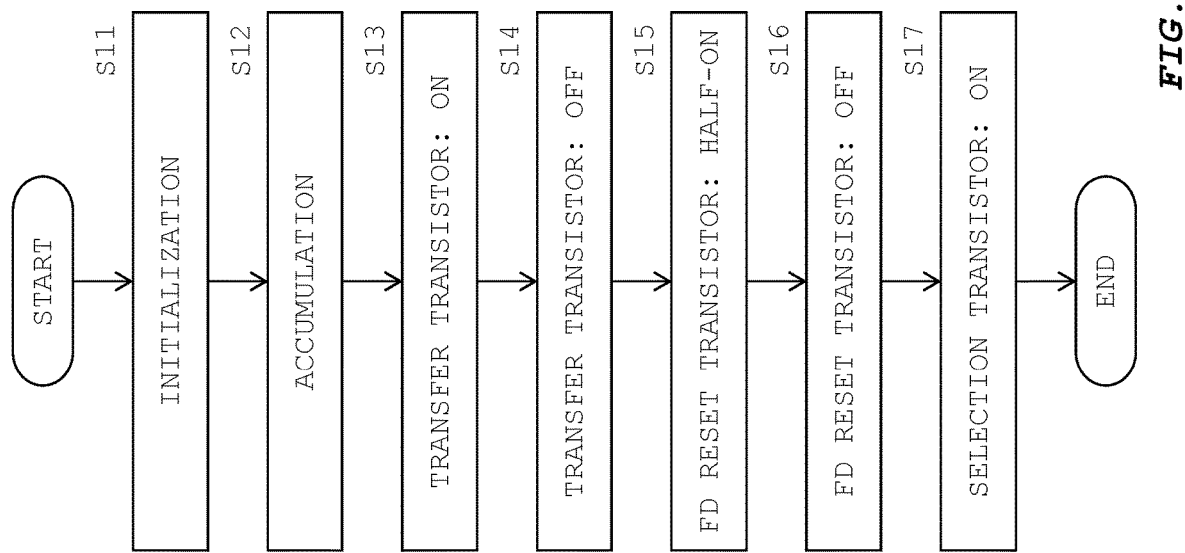
FIG. 4C is a flowchart for executing the operation sequence of the pixel cell according to Embodiment 1.

FIG. 4C is a flowchart for executing the above process.

First, the imaging control part 24 executes initialization on the pixel cell 100 (S11). Accordingly, the potential of each part is set to that in the state of FIG. 4A, and the electric charges in the cathode of the APD 101 and the floating diffusion part 110 are reset. Next, after the potential of each part is set to that in the initial state of FIG. 3A, the imaging control part 24 performs exposure to accumulate electric charges in the cathode of the APD 101 (S12). In this step, if reflected light is not incident on the APD 101, electric charges are not accumulated in the cathode of the APD 101.

Thereafter, the imaging control part 24 sets the transfer transistor 103 to be ON (S13). Accordingly, as shown in FIG. 3C, the electric charges accumulated in the cathode of the APD 101 are distributed to the floating diffusion part 110. Then, the imaging control part 24 sets the transfer transistor 103 to be OFF (S14) and further sets the FD reset transistor 104 to be half-ON (S15). Accordingly, as shown in FIG. 3D, excess electric charges are discharged from the floating diffusion part 110 via the APD reset transistor 102 to the reset drain power source PIXRSD.

Thereafter, the imaging control part 24 sets the FD reset transistor 104 to be OFF (S16) and further sets the selection transistor 106 to be ON (S17). Accordingly, the voltage corresponding to the amount of the electric charges accumulated in the floating diffusion part 110 is outputted as a detection signal to the vertical signal line Vsig. Thus, one sequence for the pixel cell 100 ends.

Thereafter, the imaging control part 24 returns the process to step S11 and repeats the same process. When reflected light is incident on the APD 101 in each sequence, the voltage corresponding to the reference accumulation potential Vq' is outputted as a detection signal from the pixel cell 100 to the imaging control part 24. When reflected light is not incident on the APD 101, electric charges are not transferred from the cathode of the APD 101 to the floating diffusion part 110 in a transfer step of FIG. 3C. In this case, even if the electric charges due to noise or the like are accumulated in the cathode of the APD 101, the potential barrier of the transfer transistor 103 set in the transfer step prevents the electric charges from being distributed to the floating diffusion part 110.

The imaging control part 24 transmits the detection signal sequentially inputted from each pixel cell 100, to the signal processing part 25. The signal processing part 25 measures the distance to an object existing at a position corresponding to each pixel cell 100, on the basis of the time difference between the timing when the detection signal is received and the timing when the light source 11 is caused to emit the emission pulse. In this manner, the distance to the object existing in the target region is measured.

Effects of Embodiment 1

According to Embodiment 1, the following effects can be achieved.

As shown in FIG. 3D, by controlling the FD reset transistor 104, the electric charges exceeding the predetermined electric charge amount, of the electric charges accumulated in the floating diffusion part 110 from the cathode of the APD 101 via the transfer transistor 103, are discharged. Accordingly, the variation of the amount of the electric charges accumulated in the floating diffusion part 110 can be reduced. More specifically, all random noise and fixed pattern noise can be suppressed within about the variation of the potential barrier of the reset transistor in the leveling-off step, and the variation of the amount of the electric charges accumulated in the floating diffusion part 110 can be reduced.

In addition, as shown in FIG. 3A to FIG. 3D and FIG. 4C, the imaging control part 24 performs transfer control of controlling the transfer transistor 103 to cause the electric charges accumulated in the cathode of the APD 101 to be accumulated in the floating diffusion part 110, and then controls the FD reset transistor 104 to discharge the electric charges exceeding the predetermined electric charge amount, of the electric charges accumulated in the floating diffusion part 110. As described above, by performing control (leveling-off) of eliminating the excess electric charges from the floating diffusion part 110 after determining the electric charges distributed from the cathode of the APD 101 to the floating diffusion part 110, the variation of the electric charges remaining in the floating diffusion part 110 can be reduced.

Moreover, as shown in FIG. 3A to FIG. 3D, by setting the height of the potential barrier of the FD reset transistor 104 to the height corresponding to the predetermined electric charge amount, the imaging control part 24 causes the electric charges exceeding the predetermined electric charge amount, of the electric charges accumulated in the floating diffusion part 110, to be discharged.

Here, the imaging control part 24 sets the potential barrier of the FD reset transistor 104 to a potential equal to or higher than the reference accumulation potential Vq'. Accordingly, the variation of the electric charges accumulated in the floating diffusion part 110 can be reliably reduced.

At this time, as shown in FIG. 3D, the imaging control part 24 sets the height of the potential barrier of the FD reset transistor 104 to the reference accumulation potential Vq'. Accordingly, the amount of the electric charges remaining in the floating diffusion part 110 after leveling-off can be determined to be the electric charge amount corresponding to the reference accumulation potential Vq'. Therefore, the variation of the electric charges accumulated in the floating diffusion part 110 can be reliably reduced.

Alternatively, as shown in FIG. 4B, the imaging control part 24 sets the height of the potential barrier of the FD reset transistor 104 to the potential higher by the variation than the reference accumulation potential Vq'. Accordingly, the amount of the electric charges remaining in the floating diffusion part 110 after leveling-off can be determined to be the potential higher by +σ than the reference accumulation potential Vq'. Therefore, the variation of the electric charges accumulated in the floating diffusion part 110 can be further reliably reduced.

Modification 1

In Embodiment 1 described above, after the transfer step of distributing the electric charges accumulated in the cathode of the APD 101 to the floating diffusion part 110, the leveling-off step of leveling off the amount of electric charges distributed to the floating diffusion part 110 to a predetermined amount is performed. On the other hand, in Modification 1, in the transfer step of distributing the electric charges accumulated in the cathode of the APD 101 to the floating diffusion part 110, a leveling-off step of leveling off an electric charge amount to a predetermined amount is simultaneously performed.

Figure 5C:
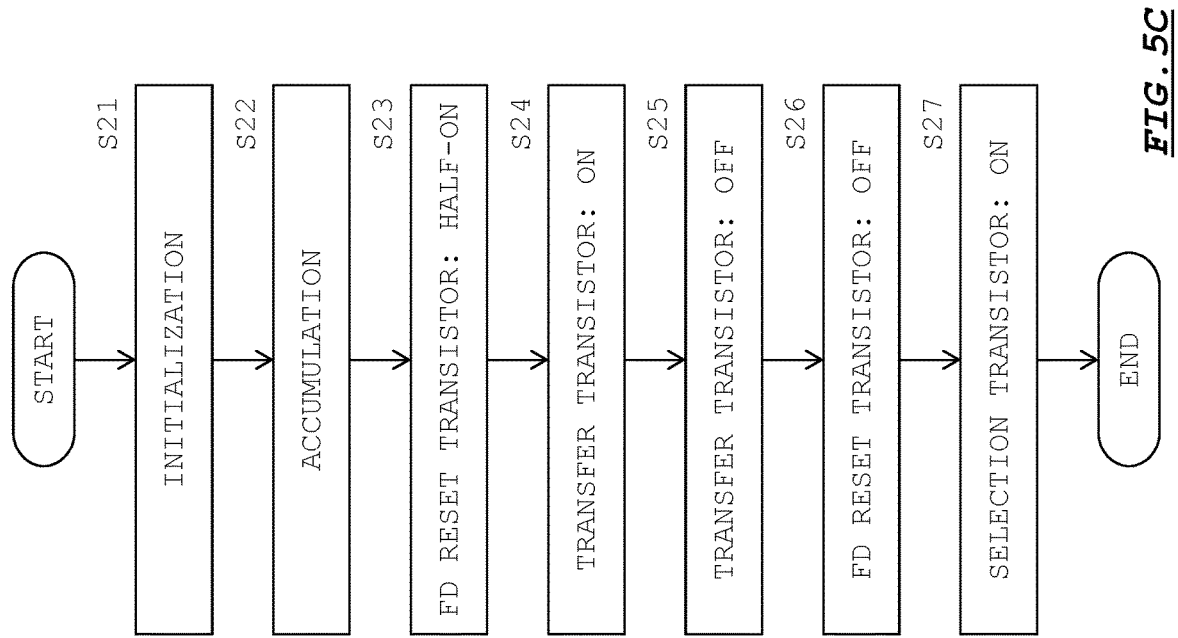
FIG. 5C is a flowchart for executing the operation sequence of the pixel cell according to Modification 1 of Embodiment 1.
Figure 5A:
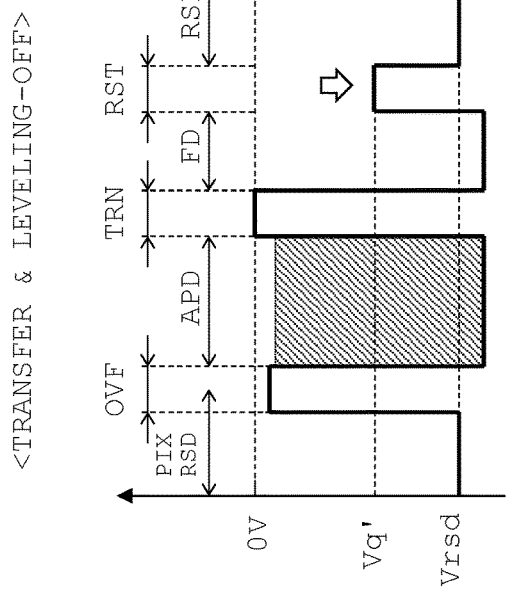
FIG. 5A and FIG. 5B are each a diagram illustrating an operation sequence of a pixel cell according to Modification 1 of Embodiment 1.
Figure 5B:
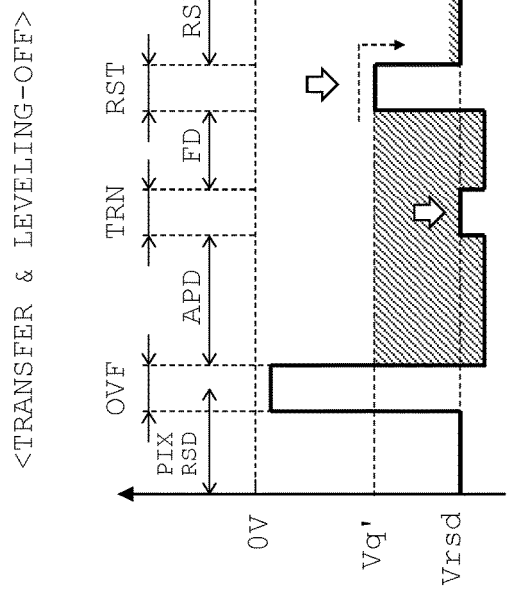

FIG. 5A and FIG. 5B are each a diagram illustrating an operation sequence of a pixel cell 100 in Modification 1. FIG. 5C is a flowchart for executing the operation sequence in Modification 1.

Similar to FIG. 4A and FIG. 4B, FIG. 5A and FIG. 5B show the potential of each part. In Modification 1, the transfer step of FIG. 3C is replaced with the steps of FIG. 5A and FIG. 5B, and the leveling-off step of FIG. 3D is omitted.

Referring to FIG. 5C, the imaging control part 24 sequentially executes an initialization step (S21) and an accumulation step (S22). The initialization step (S21) and the accumulation step (S22) are the same as steps S11 and S12 of FIG. 4C, respectively. Accordingly, similar to FIG. 3B, electric charges are accumulated in the cathode of the APD 101 in accordance with reception of reflected light.

Next, the imaging control part 24 sets the FD reset transistor 104 to be half-ON (S23). Accordingly, as shown in FIG. 5A, the potential barrier of the RST falls to the reference accumulation potential Vq'. As described with reference to FIG. 4B, the fall level of the potential barrier of the RST may not necessarily be the reference accumulation potential Vq', and may be another potential such as the potential higher by the variation than the reference accumulation potential Vq'.

Thereafter, the imaging control part 24 sets the transfer transistor 103 to be in an ON state (S24). Accordingly, the electric charges accumulated in the cathode of the APD 101 are distributed to the floating diffusion part 110. Here, since the potential barrier of the RST has already fallen, as shown in FIG. 5B, when the electric charges are distributed, the excess electric charges exceeding the potential barrier of the RST move to the RSD and are discharged to the reset drain power source RSD.

After transfer and leveling-off of the electric charges are performed simultaneously as described above, the imaging control part 24 first sets the transfer transistor 103 to be OFF to cause the potential barrier of the TRN to rise (S25), and then sets the FD reset transistor 104 to be OFF to cause the potential barrier of the RST to rise (S26). Accordingly, the amount of the electric charges accumulated in the floating diffusion part 110 is determined to be the electric charge amount corresponding to the reference accumulation potential Vq'.

Thereafter, the imaging control part 24 sets the selection transistor 106 to be ON (S27). Accordingly, the voltage corresponding to the amount of the electric charges accumulated in the floating diffusion part 110 is outputted as a detection signal to the vertical signal line Vsig. Thus, one sequence for the pixel cell 100 ends. Then, the imaging control part 24 returns the process to S21 and repeats the same process.

According to Modification 1, while transfer control of causing the electric charges accumulated in the cathode of the APD 101 to be accumulated in the floating diffusion part 110 is performed, the FD reset transistor 104 is controlled such that the electric charges exceeding a predetermined electric charge amount (for example, the electric charge amount corresponding to the reference accumulation potential Vq'), of the electric charges accumulated in the floating diffusion part 110 from the cathode of the APD 101 via the transfer transistor 103, are discharged. That is, transfer and leveling-off of the electric charges are performed simultaneously. Therefore, control on the pixel cell 100 can be simplified as compared to Embodiment 1 described above.

In the flowchart of FIG. 5C, step S23 and step S24 may be interchanged with each other. In this case as well, in the transfer step, simultaneously, the electric charges accumulated in the floating diffusion part 110 are levelled off to a predetermined electric charge amount (for example, the electric charge amount corresponding to the reference accumulation potential Vq').

Modification 2

In Embodiment 1 described above, after the transfer step of distributing the electric charges accumulated in the cathode of the APD 101 to the floating diffusion part 110, the leveling-off step of leveling off the amount of electric charges distributed to the floating diffusion part 110 to a predetermined amount is performed. On the other hand, in Modification 2, in the accumulation step of accumulating electric charges in the cathode of the APD 101, a distribution step of distributing electric charges to the floating diffusion part 110 and a leveling-off step of leveling off the amount of the electric charges accumulated in the floating diffusion part 110 to a predetermined amount are performed simultaneously.

Figure 6C:
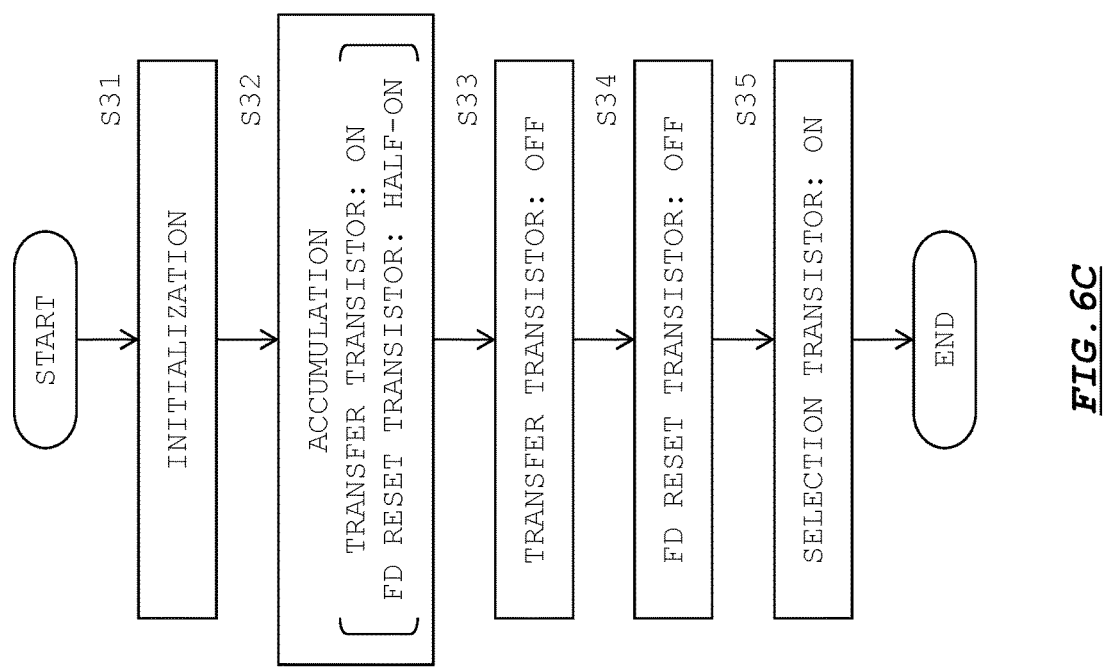
FIG. 6C is a flowchart for executing the operation sequence of the pixel cell according to Modification 2 of Embodiment 1.
Figure 6A:
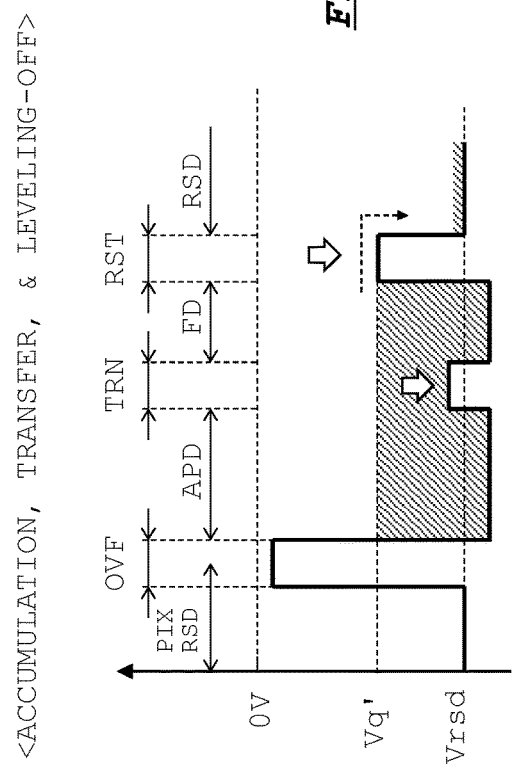
FIG. 6A and FIG. 6B are each a diagram illustrating an operation sequence of a pixel cell according to Modification 2 of Embodiment 1.
Figure 6B:
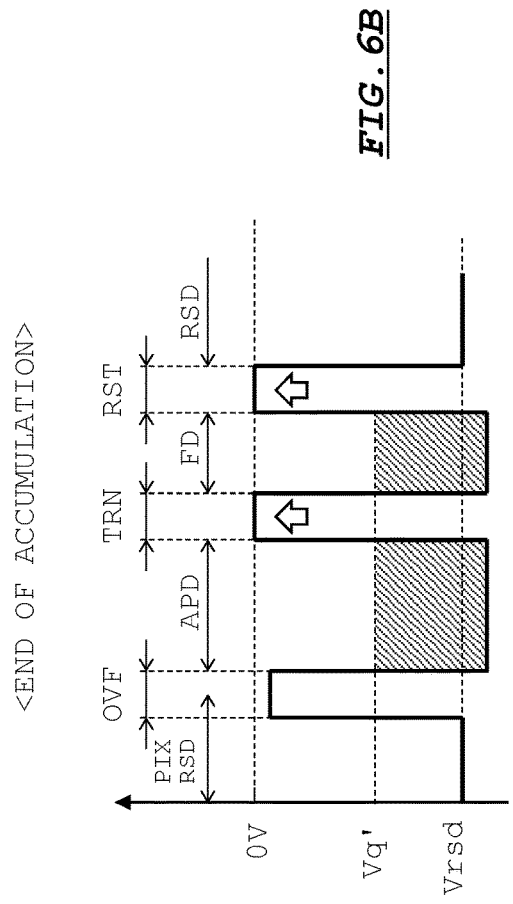

FIG. 6A and FIG. 6B are each a diagram illustrating an operation sequence of the pixel cell 100 in Modification 2. FIG. 6C is a flowchart for executing the operation sequence in Modification 2.

Similar to FIG. 4A and FIG. 4B, FIG. 6A and FIG. 6B show the potential of each part. In Modification 2, the accumulation step of FIG. 3C is replaced with the steps of FIG. 6A and FIG. 6B, and the transfer step and the leveling-off step of FIG. 3C and FIG. 3D are omitted.

Referring to FIG. 6C, first, the imaging control part 24 executes an initialization step (S31). The initialization step (S31) is the same as step S11 of FIG. 4C.

Next, the imaging control part 24 executes an accumulation step (S32). At this time, the imaging control part 24 sets the transfer transistor 103 to be ON, further sets the FD reset transistor 104 to be half-ON, and performs exposure control. Accordingly, electric charges are accumulated in the cathode of the APD 101 in accordance with reception of reflected light.

At this time, as shown in FIG. 6A, since the transfer transistor 103 is ON, the potential barrier of the TRN falls to a transfer level, so that the electric charges accumulated in the cathode of the APD 101 are distributed to the floating diffusion part 110. In addition, as shown in FIG. 6A, since the FD reset transistor 104 is half-ON, the potential barrier of the RST falls to the reference accumulation potential Vq', so that the excess electric charges exceeding the potential barrier of the RST, of the electric charges distributed to the floating diffusion part 110, move to the RSD and are discharged to the reset drain power source RSD.

In this case as well, as described with reference to FIG. 4B, the fall level of the potential barrier of the RST may not necessarily be the reference accumulation potential Vq', and may be another potential such as the potential higher by the variation than the reference accumulation potential Vq'.

After accumulation, transfer, and leveling-off of the electric charges are performed simultaneously as described above, the imaging control part 24 first sets the transfer transistor 103 to be OFF to cause the potential barrier of the TRN to rise (S33), and then sets the FD reset transistor 104 to be OFF to cause the potential barrier of the RST to rise (S34). Accordingly, the amount of the electric charges accumulated in the floating diffusion part 110 is determined to be the electric charge amount corresponding to the reference accumulation potential Vq'.

Thereafter, the imaging control part 24 sets the selection transistor 106 to be ON (S35). Accordingly, the voltage corresponding to the amount of the electric charges accumulated in the floating diffusion part 110 is outputted as a detection signal to the vertical signal line Vsig. Thus, one sequence for the pixel cell 100 ends. Then, the imaging control part 24 returns the process to S31 and repeats the same process.

According to Modification 2, during accumulation control of accumulating electric charges in the cathode of the APD 101, the transfer transistor 103 is controlled such that the electric charges are distributed from the cathode of the APD 101 to the floating diffusion part 110, and the FD reset transistor 104 is further controlled such that the electric charges exceeding a predetermined electric charge amount (for example, the electric charge amount corresponding to the reference accumulation potential Vq'), of the electric charges accumulated in the floating diffusion part 110, are discharged. That is, accumulation, transfer, and leveling-off of the electric charges are performed simultaneously. Therefore, control on the pixel cell 100 can be simplified as compared to Embodiment 1 described above.

Embodiment 2

In Embodiment 1 described above, electric charges accumulated in the floating diffusion part 110 through one time of an operation sequence are converted into a voltage, and the voltage is outputted to the vertical signal line Vsig. On the other hand, in Embodiment 2, electric charges accumulated in the floating diffusion part 110 through a plurality of times of an operation sequence are accumulated in a memory part, then the electric charges in the memory part are converted into a voltage, and the voltage is outputted to the vertical signal line Vsig. That is, in Embodiment 2, the number of times reflected light (photons) is incident on the APD 101 in a plurality of times of an operation sequence is counted as the amount of the electric charges accumulated in the memory part. The amount of the electric charges accumulated in the memory part is an electric charge amount corresponding to the number of times reflected light (photons) is incident on the APD 101.

Figure 7:
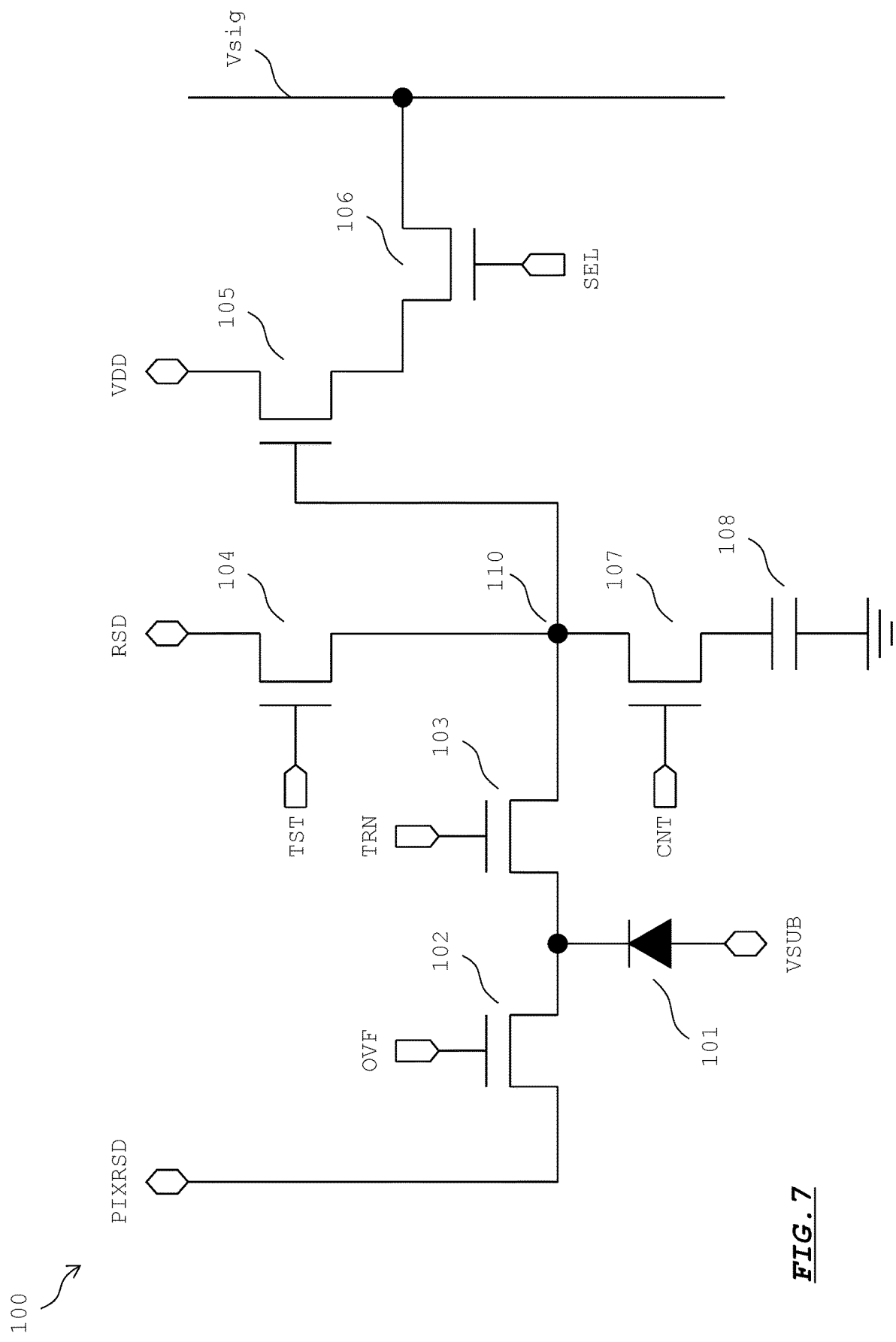
FIG. 7 is a diagram showing a configuration of a pixel cell according to Embodiment 2.

FIG. 7 is a diagram showing a configuration of a pixel cell 100 according to Embodiment 2.

In Embodiment 2, a count transistor 107 and a memory part 108 are added to the configuration of FIG. 2. The memory part 108 is a capacitor that accumulates electric charges. The count transistor 107 connects the floating diffusion part 110 and the memory part 108. By applying a count signal CNT to the gate of the count transistor 107, electric charges accumulated in the floating diffusion part 110 are transferred to the memory part 108 via the count transistor 107.

The capacity of the memory part 108 is larger than the capacity of the floating diffusion part 110. For example, the capacity of the memory part 108 is set to be about 5 times the capacity of the floating diffusion part 110. However, the method for setting the capacity of the memory part 108 is not limited thereto, and various setting methods may be applied.

FIG. 8A to FIG. 8D and FIG. 9A to FIG. 9D are each a diagram illustrating an operation sequence of the pixel cell 100.

FIG. 8A to FIG. 8D and FIG. 9A to FIG. 9D each show a potential diagram of a circuitry from the reset drain power source PIXRSD in FIG. 7 through the APD reset transistor 102, the transfer transistor 103, the floating diffusion part 110, and the count transistor 107 to the memory part 108. On the vertical axis, the direction of an arrow is the direction of low potential.

Similar to FIG. 3A to FIG. 3D, in FIG. 8A to FIG. 8D and FIG. 9A to FIG. 9D, "PIXRSD", "APD", and "FD" indicate the potential of the reset drain power source PIXRSD, the potential of the cathode of the APD 101, and the potential of the floating diffusion part 110, respectively. Moreover, similar to FIG. 3A to FIG. 3D, "OVF" and "TRN" indicate the potential of the APD reset transistor 102 and the potential of the transfer transistor 103, respectively. In addition, "MEM" indicates the potential of the memory part 108, and "CNT" indicates the potential of the count transistor 107.

In Embodiment 2 as well, in each operation sequence, after the initialization step of FIG. 4A is performed, the steps of FIG. 3A to FIG. 3D are executed, and electric charges are accumulated in the floating diffusion part 110. Instead of the steps of FIG. 3A to FIG. 3D, the step of Modification 1 or Modification 2 may be performed, and electric charges may be accumulated in the floating diffusion part 110.

FIG. 8A shows a state where the FD reset transistor 104 is set to be OFF after the leveling-off step of FIG. 3D is performed. At this time, the count transistor 107 is set to be OFF, and a potential barrier is generated at the CNT.

Thereafter, the imaging control part 24 sets the count transistor 107 to be ON. Accordingly, as shown in FIG. 8B, the potential barrier of the CNT disappears, and the electric charges accumulated in the floating diffusion part 110 are distributed to the memory part 108. After the distribution (transfer) of the electric charges to the memory part 108 is performed as described above, the imaging control part 24 sets the count transistor 107 to be OFF. Accordingly, as shown in FIG. 8C, a potential barrier is generated at the CNT, and the amount of the electric charges accumulated in the memory part 108 is determined to be an electric charge amount corresponding to one time of photon incidence.

When one sequence for accumulating electric charges in the memory part 108 ends as such, the imaging control part 24 executes the next sequence. Accordingly, the operation of FIG. 3A to FIG. 3D is executed. At this time, if reflected light (photons) is incident on the APD 101, the amount of electric charges corresponding to the reference accumulation potential Vq' is accumulated in the floating diffusion part 110 as shown in FIG. 8D.

Figure 9A:
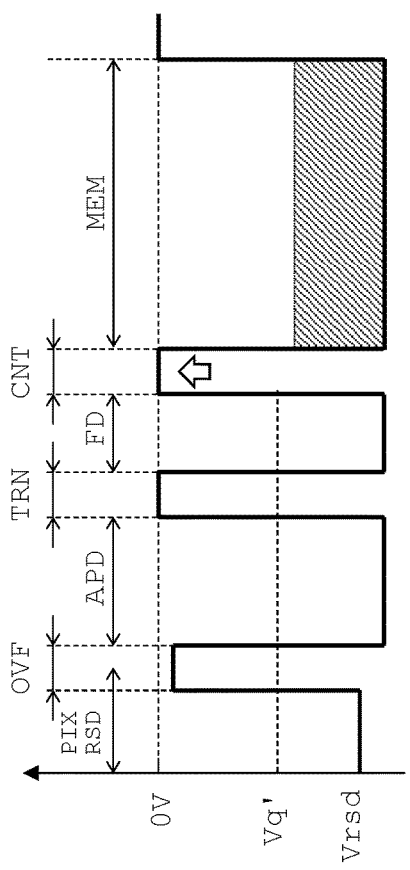
FIG. 9A to FIG. 9D are each a diagram illustrating the operation sequence of the pixel cell according to Embodiment 2.
Figure 9C:
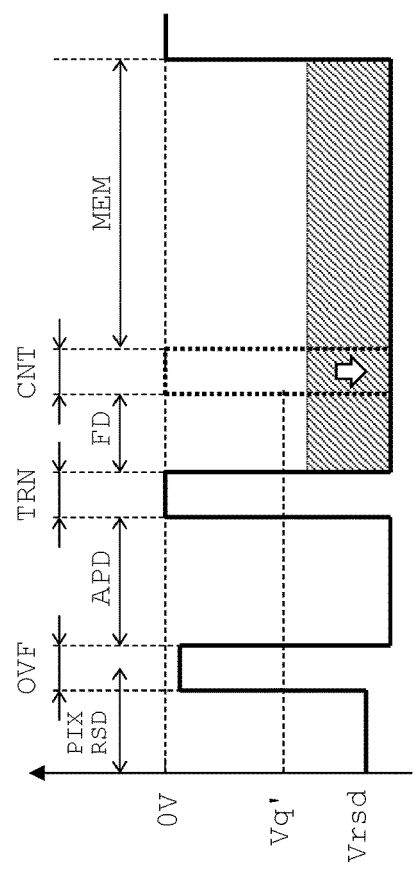
Figure 9B:
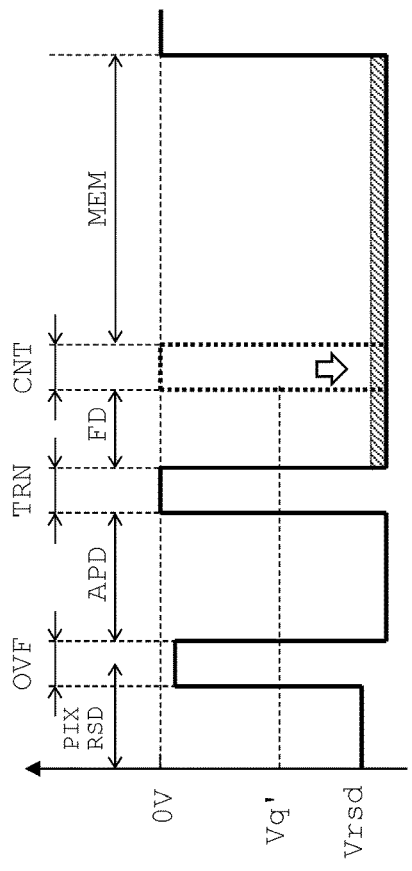

Similar to the above, the imaging control part 24 sets the count transistor 107 to be ON. Accordingly, as shown in FIG. 9A, the potential barrier of the CNT disappears, and the electric charges accumulated in the floating diffusion part 110 are distributed to the memory part 108. As a result, the amount of the electric charges accumulated in the memory part 108 increases by the amount of electric charges corresponding to one photon count. Then, the imaging control part 24 sets the count transistor 107 to be OFF. Accordingly, as shown in FIG. 9B, a potential barrier is generated at the CNT, and the amount of the electric charges accumulated in the memory part 108 is determined to be the electric charge amount corresponding to two times of photon incidence.

The imaging control part 24 repeats the same sequence a predetermined number of times. Accordingly, in each sequence, each time reflected light (photons) is incident on the APD 101, the amount of electric charges corresponding to one photon count is accumulated in the memory part 108. When the predetermined number of times of sequence ends as such, for example, an amount of electric charges shown in FIG. 9C is accumulated in the memory part 108.

Figure 9D:
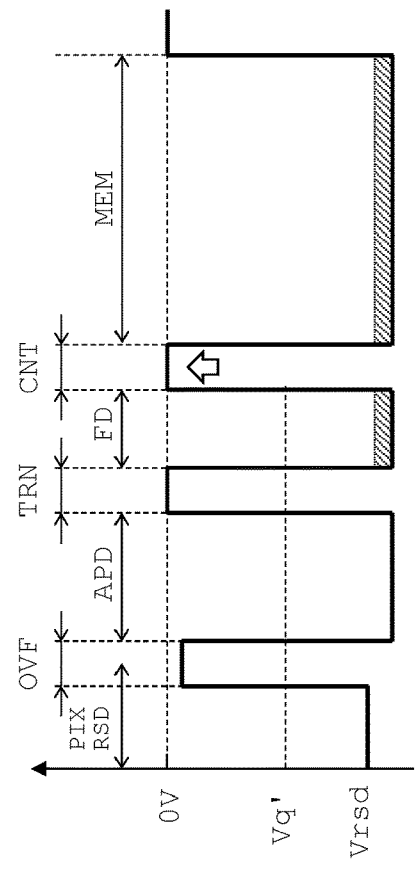

Thereafter, the imaging control part 24 sets the count transistor 107 to be ON. Accordingly, as shown in FIG. 9D, the potential barrier of the CNT disappears, and the electric charges accumulated in the memory part 108 are distributed to the floating diffusion part 110. Then, the imaging control part 24 sets the selection transistor 106 to be ON. Accordingly, a voltage corresponding to the electric charges accumulated in the memory part 108 is outputted as a detection signal to the vertical signal line Vsig. The detection signal has a magnitude corresponding to the number of times reflected light (photons) is incident on the APD 101.

Figure 10B:
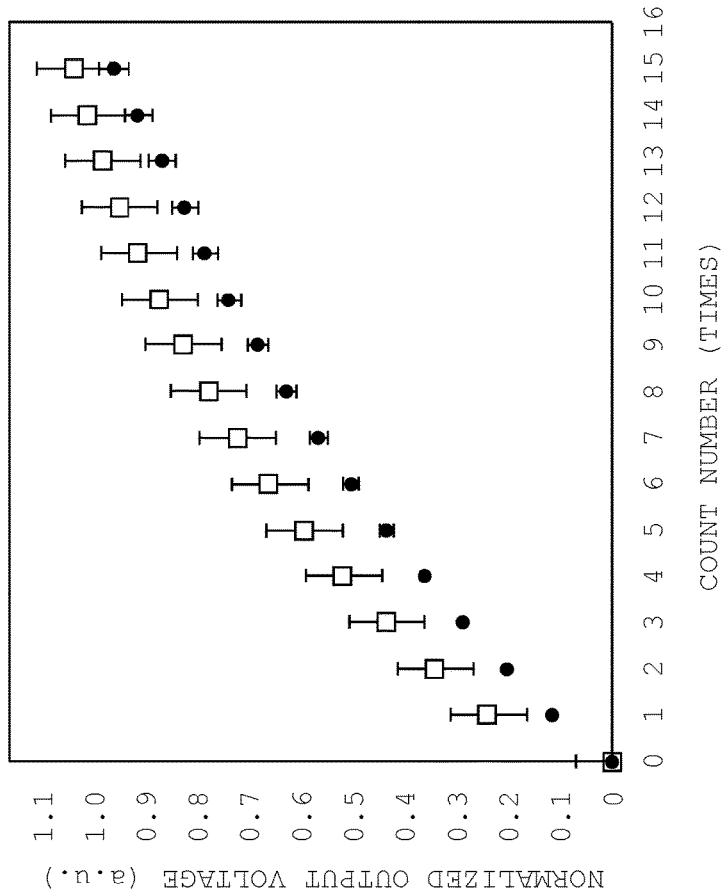
FIG. 10B is a graph showing verification results of experimentally verifying the relationship between a photon count number, and an output voltage when electric charges accumulated in a memory part are converted into a voltage, according to Embodiment 2.
Figure 10A:
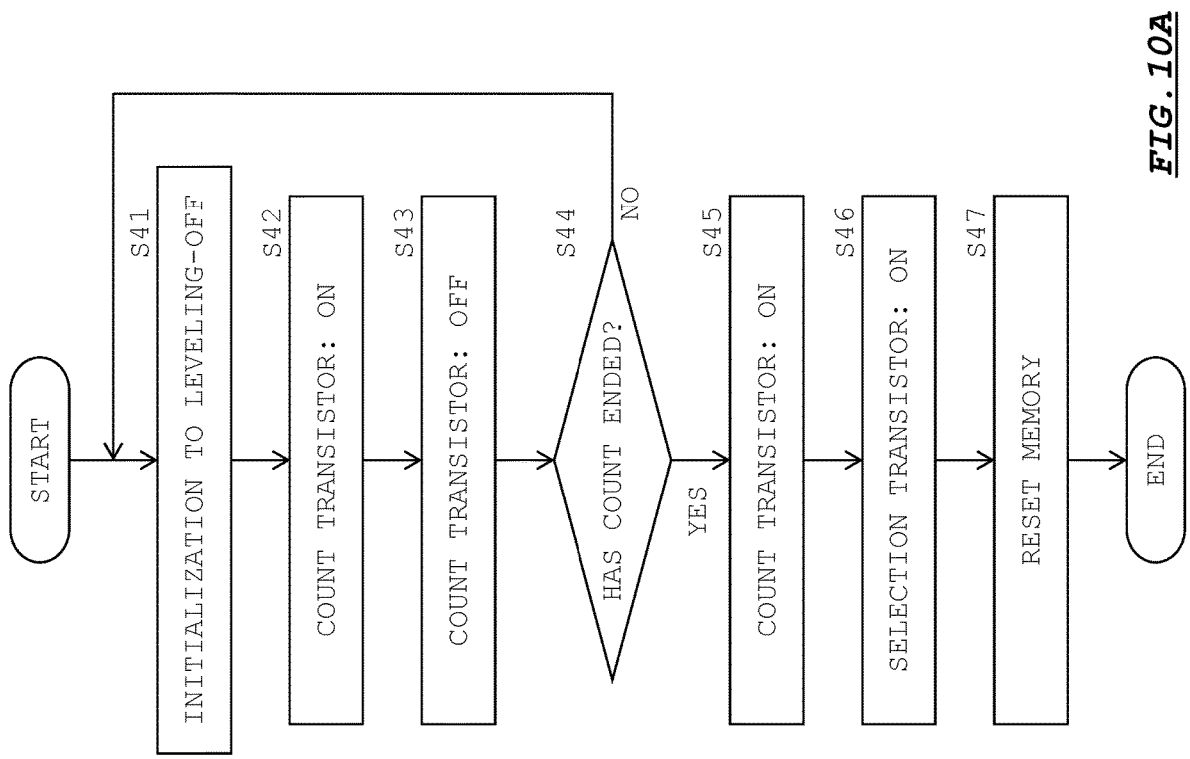
FIG. 10A is a flowchart for executing the operation sequence of the pixel cell according to Embodiment 2.

FIG. 10A is a flowchart for executing the above process.

The imaging control part 24 performs a step from initialization to leveling-off on the pixel cell 100 (S41). In this step, if reflected light (photons) is incident on the APD 101, the amount of electric charges corresponding to one photon count is accumulated in the floating diffusion part 110 as shown in FIG. 8A.

Next, the imaging control part 24 sets the count transistor 107 to be ON (S42). Accordingly, as shown in FIG. 8B, the electric charges accumulated in the floating diffusion part 110 are distributed to the memory part 108. Then, the imaging control part 24 sets the count transistor 107 to be OFF (S43). Accordingly, as shown in FIG. 8C, the electric charges distributed to the memory part 108 are determined.

Thereafter, the imaging control part 24 repeats the sequence of steps S41 to S43 a predetermined number of times (S44). When this number of times of the sequence ends (S44: YES), the imaging control part 24 sets the count transistor 107 to be ON (S45). Accordingly, the electric charges accumulated in the memory part 108 are distributed to the floating diffusion part 110. Then, the imaging control part 24 sets the selection transistor 106 to be ON for a predetermined time, and causes a voltage corresponding to the amount of the electric charges in the floating diffusion part 110, to be outputted to the vertical signal line Vsig (S46).

After the detection signal of the voltage value corresponding to the photon count number is outputted to the vertical signal line Vsig as described above, the imaging control part 24 sets the FD reset transistor 104 to be ON, and the electric charges accumulated in the floating diffusion part 110 and the memory part 108 are discharged to the reset drain power source RSD (S47). Accordingly, one sequence for photon counting ends. Then, the imaging control part 24 returns the process to S41 and repeats the same process.

The configuration of Embodiment 2 is suitable, for example, for the case where the imaging device 20 is mounted on a measurement device that irradiates a target region with light to measure the reflectance of the target region. In this case, if the reflectance of an object existing in the target region is low, for example, reflected light (photons) is incident on the APD 101 only a few times out of 10 times of pulsed light emission. That is, the photon count number (voltage corresponding to the amount of the electric charges accumulated in the memory part 108) obtained in each pixel cell 100 can correspond to the reflectance of the object. Therefore, the measurement device can measure the reflectance at the position, on the target region, corresponding to each pixel cell 100, on the basis of the detection signal of each pixel cell 100 inputted from the imaging device 20, that is, the voltage corresponding to the photon count number (voltage corresponding to the amount of the electric charges accumulated in the memory part 108). Accordingly, the measurement device can generate an image in which the reflectance is mapped at the position, corresponding to each pixel cell 100, on the target region.

Furthermore, the configuration of Embodiment 2 is also suitable, for example, for the case where the imaging device 20 is mounted on a distance image capturing device. In this case, the gate of the transfer transistor 103 is opened for a time during which a certain target distance region is irradiated with light and the light is reflected on the target distance region and returns, and electric charges are accumulated in the floating diffusion part 110. If there is an object in the target distance region, reflected light (photons) is incident on the APD 101, so that avalanche multiplication occurs, and electric charges are accumulated and finally appear as a pixel signal. On the other hand, if there is no object in the target distance region, reflected light (photons) is not incident on the APD 101, so that electric charges are not accumulated and cannot finally appear as a pixel signal. At this time, if the reflectance of the object existing in the target distance region is low, reflected light (photons) does not return to the APD 101, so that electric charges are not accumulated and cannot finally appear as a pixel signal in some cases. Therefore, it is necessary to perform pulsed light emission a plurality of times such that even an object having a low reflectance can be detected. By performing such an operation for a plurality of target distance regions and combining reflected light (photon) images obtained for the respective target distance regions, a distance image can be generated.

Effects of Embodiment 2

In Embodiment 2 as well, through the operation of FIG. 3A to FIG. 3D, the electric charges accumulated in the floating diffusion part 110 are fixed to a predetermined electric charge amount. Then, the fixed amount of the electric charges is accumulated in the memory part 108, and the amount of electric charges corresponding to the photon count number is accumulated in the memory part 108. Therefore, the amount of the electric charges accumulated in the memory part 108 can be more accurately caused to correspond to the photon count number.

FIG. 10B is a graph showing verification results of experimentally verifying the relationship between a photon count number and an output voltage when the electric charges accumulated in the memory part 108 are converted into a voltage.

The number of times photons were caused to be incident on APD 101 was changed, and the output voltage was measured for each number of times. As a comparative example, the same measurement was performed for the case where the leveling-off step of FIG. 3D was not performed.

In FIG. 10B, a black circle plot is the measurement result when the step of Embodiment 2 was executed, and a white square plot is the measurement result when the step of the comparative example was executed. Here, an experiment for measuring the output voltage for each count number (number of times of photon incidence) was performed a plurality of times, and the average value of the output voltages measured in the respective experiments is shown as a black circle or white triangle plot. In each plot, a bar indicating the range of variation of the experimental results is added.

As shown in FIG. 10B, in the step of Embodiment 2, electric charges accumulated in the floating diffusion part 110 were levelled off, so that the output voltage for each count number was lower than the output voltage of the comparative example when compared to the step of the comparative example. However, in the step of Embodiment 2, the amount of the electric charges accumulated in the floating diffusion part 110 was fixed to a constant amount by this leveling-off, so that the variation of the output voltage for each count number was significantly suppressed as compared to the step of the comparative example. As described above, through the above experiment, it is confirmed that the amount of the electric charges accumulated in the memory part 108 can be more accurately caused to correspond to the photon count number, and a more accurate output voltage (detection signal) can be obtained.

In the step of Embodiment 2 as well, the variation of the output voltage became wider as the count number increased. This variation is considered to be due to a slight change in the height of the potential barrier of the RST in the leveling-off step of FIG. 3D. However, it is confirmed that since this variation is small, the output voltage and the count number can be caused to correspond to each other in a substantially one-to-one manner, and in particular, in the range where the count number is up to about 15 times, a photon count number can be appropriately obtained from the output voltage.

Also, it can be seen that, as shown in FIG. 10B, as a result of performing the leveling-off step, the effect as an equalizer for improving the linearity of the photon count is also achieved. The reason for this will be described below.

In the case of the comparative example in which the leveling-off step was not performed, the output voltage with respect to the photon count number is drawn by a curve determined by the capacity distribution between the floating diffusion part 110 and the memory part 108, as shown in the white square plot. That is, the difference in output voltage becomes larger when there is no electric charge in the memory part 108 or when electric charges corresponding to a smaller count number are merely accumulated in the memory part 108, and conversely, the difference in output voltage becomes smaller when electric charges corresponding to a larger count number are accumulated in the memory part 108.

On the other hand, when the leveling-off step is performed, a part of accumulated electric charges per count is discarded by leveling-off in order to make the variation of the accumulated electric charges in each pixel cell 100 to be substantially constant. As a result, as for the output voltage with respect to the photon count number, as shown in the black circle plot, the difference in output voltage increased per count is decreased when there is no electric charge in the memory part 108 or when electric charges corresponding to a smaller count number are merely accumulated in the memory part 108, and conversely, even when electric charges corresponding to a larger count number are accumulated in the memory part 108, the difference in output voltage can be maintained larger as compared to the comparative example. Therefore, the effect as an equalizer for improving the linearity of the photon count with respect to the output voltage is achieved, and can be accurately performed up to a large count number.

Embodiment 3

In Embodiments 1 and 2 described above, the level for leveling off the electric charges accumulated in the floating diffusion part 110 (height of the potential barrier of the RSD at the time of half-ON) is constant. However, the reference accumulation potential Vq' can change due to various factors such as environmental temperature and aging. Therefore, the leveling-off level for electric charges is preferably reset in accordance with the change of the reference accumulation potential Vq'.

Therefore, in Embodiment 3, the imaging control part 24 monitors a predetermined index that can be a change factor of the reference accumulation potential Vq', and resets the height of the potential barrier of the RSD at the time of half-ON on the basis of this index.

Figure 11B:
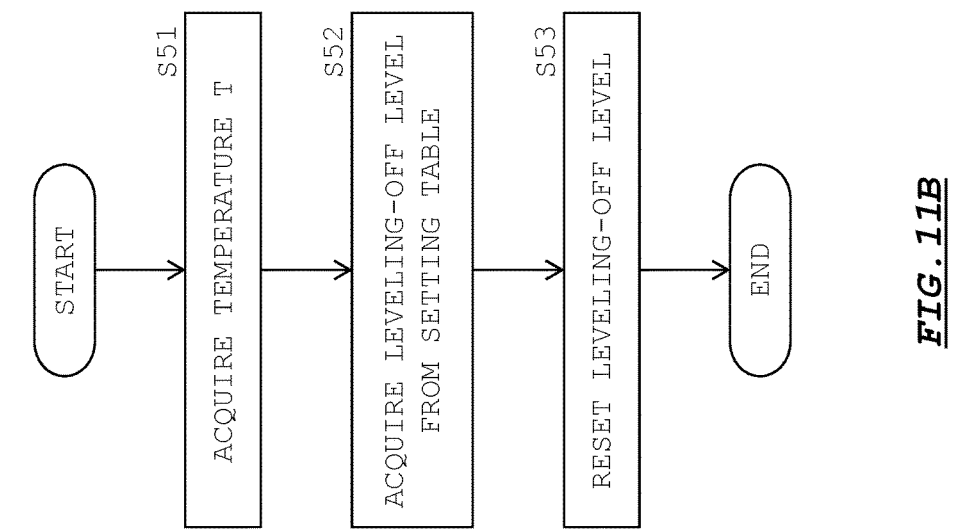
FIG. 11B is a flowchart showing a process for resetting a leveling-off level according to Embodiment 3.
Figure 11A:
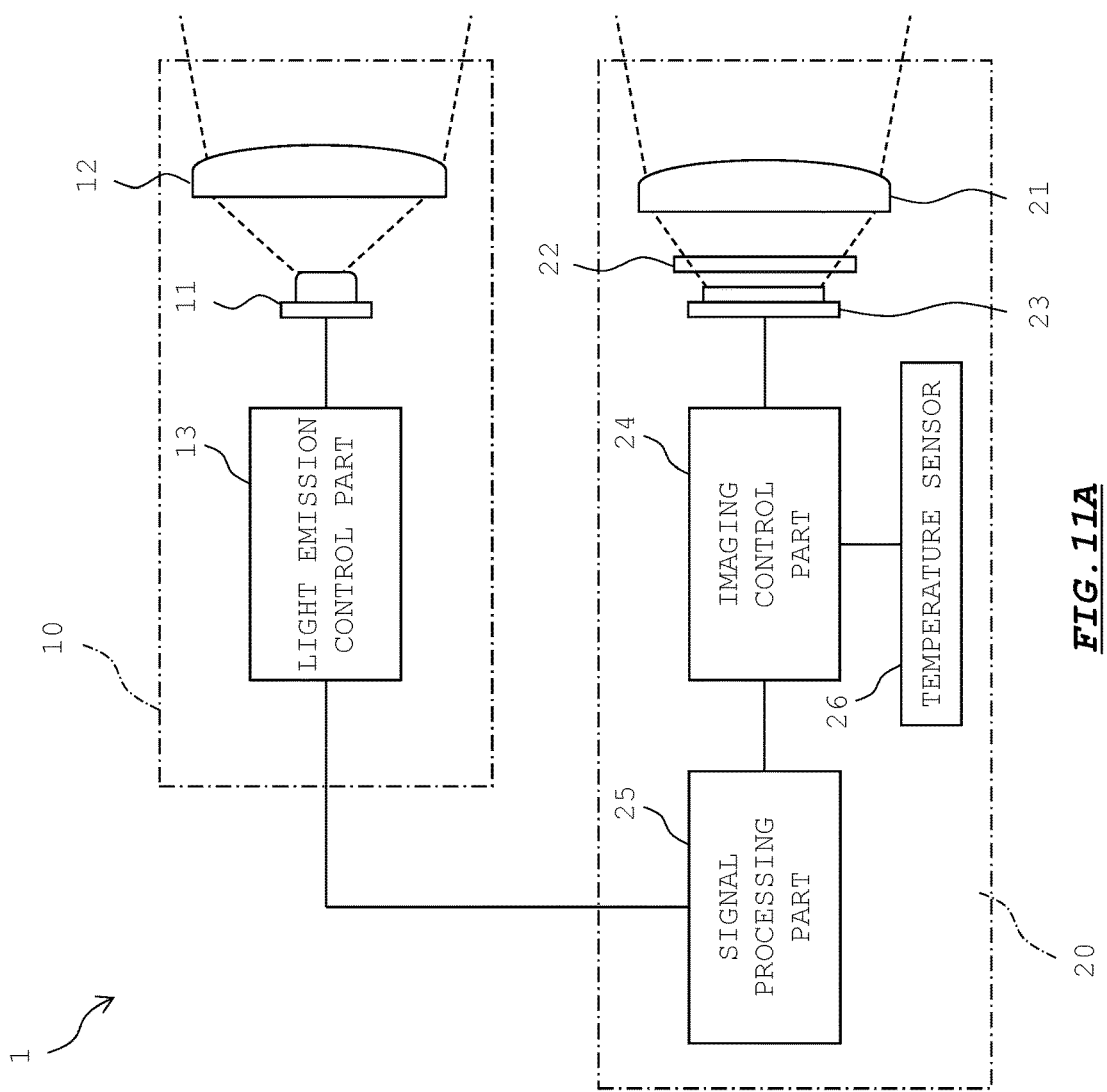
FIG. 11A is a diagram showing a configuration of a distance measurement device according to Embodiment 3.

FIG. 11A is a diagram showing a configuration of a distance measurement device 1 according to Embodiment 3. Here, the environmental temperature is used as a predetermined index that can be a change factor of the reference accumulation potential Vq'.

As shown in FIG. 11A, the imaging device 20 further includes a temperature sensor 26. The temperature sensor 26 detects the temperature of the solid-state imaging element 23 or the ambient temperature thereof. The imaging control part 24 resets the leveling-off level for leveling off the electric charges accumulated in the floating diffusion part 110 (height of the potential barrier of the RSD at the time of half-ON) on the basis of temperature information inputted from the temperature sensor 26.

The imaging control part 24 holds a setting table in which a temperature and a leveling-off level are associated in advance. As the temperature of the APD 101 changes, the saturated electric charge amount generated by the APD 101 changes. Therefore, the reference accumulation potential Vq' changes as the temperature of the APD 101 changes. In the setting table, the temperature and the leveling-off level are associated with each other so as to deal with such a phenomenon.

The leveling-off level is set, for example, to be the same as the reference accumulation potential Vq' at each temperature. Alternatively, the leveling-off level may be set to another value equal to or higher than the reference accumulation potential Vq' at each temperature, for example, the value higher by the variation than the reference accumulation potential Vq'. In the setting table, a predetermined temperature range and a leveling-off level may be associated with each other. As the leveling-off level, the value of a voltage to be applied to the FD reset transistor 104 in order to realize the leveling-off level may be described in the setting table.

FIG. 11B is a flowchart showing a process for resetting the leveling-off level.

The imaging control part 24 refers to temperature information inputted from the temperature sensor 26 at predetermined time intervals (S51). Then, the imaging control part 24 acquires the leveling-off level corresponding to the temperature of the referenced temperature information, from the setting table (S52), and resets the acquired leveling-off level as a leveling-off level to be used at the time of half-ON (S53). Then, the imaging control part 24 returns the process to S51 and repeats the same process.

Effects of Embodiment 3

According to the configuration of Embodiment 3, since the leveling-off level is reset in accordance with the change of the reference accumulation potential Vq', the electric charges accumulated in the floating diffusion part 110 can be leveled off at a more appropriate leveling-off level. Accordingly, the amount of the electric charges accumulated in the floating diffusion part 110 can be more reliably fixed to a constant amount.

In FIG. 11B, the leveling-off level at each temperature is acquired using the setting table, but the leveling-off level at each temperature may be calculated by calculation based on a predetermined calculation formula. In addition, here, the environmental temperature is used as a predetermined index that can be a change factor of the reference accumulation potential Vq', but the leveling-off level may be reset using another index that can be a change factor of the reference accumulation potential Vq', such as the accumulated use time and the accumulated number of uses of the imaging control part 24.

Modifications

Although the embodiments of the present invention have been described above, the present invention is not limited to Embodiments 1 to 3 described above, and various modifications can also be made to embodiments of the present invention other than Embodiments 1 to 3 described above.

For example, the potential and capacity of each part shown in FIG. 3A to FIG. 3D, FIG. 4A, FIG. 4B, FIG. 5A, FIG. 5B, FIG. 6A, FIG. 6B, FIG. 8A to FIG. 8D, FIG. 9A, and FIG. 9B are merely examples, and may be changed as appropriate to other potential and capacity.

The configuration of the imaging device 20 is not limited to the configurations shown in FIG. 1 and FIG. 11, and various modifications can be made thereto. For example, the filter 22 may be omitted when it is not necessary to receive only light having a predetermined wavelength.

The imaging control part 24 can also be controlled with a higher degree of freedom on the basis of a control signal from the outside of a chip.

Each processing part included in the solid-state imaging device 1 is typically realized as an LSI which is an integrated circuit. These processing parts may be individually formed on one chip, or some or all of the processing parts may be integrated on one chip. Moreover, the integrated circuit implementation is not limited to the LSI, but may be achieved by a dedicated circuit or a general-purpose processor. A field programmable gate array (FPGA) which is programmable after production of an LSI, and a reconfigurable processor in which the connection and the setting of circuit cells within the LSI are reconfigurable, may be used.

At least some of the functions of the solid-state imaging devices according to Embodiments 1 to 3 described above and the modifications thereof may be combined.

The numbers used above are all examples illustrated for specifically describing the present invention, and the present invention is not limited to the illustrated numbers. In addition, the example in which MOS transistors are used is shown in the above description, but other transistors may be used.

In Embodiments 1 to 3 described above, the example in which the imaging device 20 is mounted on the distance measurement device 1 is shown, but the application form of the imaging device 20 is not limited thereto. For example, the present invention may be applied to an imaging device used in fields such as medical treatment and radiation measurement.

In addition to the above, various modifications can be made as appropriate to the embodiments of the present invention, without departing from the scope of the technological idea defined by the claims.

What is claimed is:

1. An imaging device comprising:
  a solid-state imaging element having a plurality of pixel cells arranged in a matrix; and
  a controller configured to control the solid-state imaging element, wherein
  the pixel cells each include:
    an avalanche photodiode;
    a floating diffusion region configured to accumulate electric charges;
    a transfer transistor connecting a cathode of the avalanche photodiode and the floating diffusion region; and
    a reset transistor for resetting the electric charges accumulated in the floating diffusion region, and
  the controller is further configured to:
    control the reset transistor to discharge electric charges exceeding a predetermined electric charge amount, of the electric charges accumulated in the floating diffusion region, from the cathode of the avalanche photodiode via the transfer transistor, by setting a height of a potential barrier of the reset transistor to a height corresponding to the predetermined electric charge amount; and
    set the height of the potential barrier to a potential equal to or higher than a reference accumulation potential corresponding to a standard amount of electric charges accumulated in the floating diffusion region when electric charges whose amount is equal to a saturated electric charge amount are generated in the avalanche photodiode.

2. The imaging device according to claim 1, wherein
after the controller performs transfer control of controlling the transfer transistor to cause electric charges accumulated in the cathode of the avalanche photodiode to be accumulated in the floating diffusion region,
the controller controls the reset transistor to discharge the electric charges exceeding the predetermined electric charge amount, of the electric charges accumulated in the floating diffusion region.

3. The imaging device according to claim 1, wherein
while the controller performs transfer control of controlling the transfer transistor to cause electric charges accumulated in the cathode of the avalanche photodiode to be accumulated in the floating diffusion region,
the controller controls the reset transistor to discharge the electric charges exceeding the predetermined electric charge amount, of the electric charges accumulated in the floating diffusion region from the cathode of the avalanche photodiode via the transfer transistor.

4. The imaging device according to claim 1, wherein
while the controller causes electric charges to be accumulated in the cathode of the avalanche photodiode,
the controller controls the transfer transistor to cause electric charges to be accumulated in the floating diffusion region from the cathode of the avalanche photodiode, and
the controller controls the reset transistor to discharge the electric charges exceeding the predetermined electric charge amount, of the electric charges accumulated in the floating diffusion region.

5. The imaging device according to claim 1, wherein the controller sets the height of the potential barrier to the reference accumulation potential.

6. The imaging device according to claim 1, wherein the controller sets the height of the potential barrier to a potential higher by a variation than the reference accumulation potential.

7. The imaging device according to claim 1, wherein the controller monitors a predetermined index that can be a change factor of the reference accumulation potential, and resets the height of the potential barrier on the basis of the index.

8. The imaging device according to claim 1, further comprising:
  a memory configured to accumulate electric charges; and
  a count transistor connecting the floating diffusion region and the memory.

9. The imaging device according to claim 1, further comprising an amplification transistor for converting an amount of the electric charges accumulated in the floating diffusion region into a voltage.

10. The imaging device according to claim 1, wherein the controller is further configured to perform only a single exposure to allow each pixel cell to accumulate the electric charges in the floating diffusion region.

* * * * *